(12) United States Patent
Shin

(10) Patent No.: US 10,778,856 B1
(45) Date of Patent: Sep. 15, 2020

(54) MULTI-PURPOSE/MULTI-FUNCTION PORTABLE ELECTRONIC DEVICE WHICH INCLUDES A DISPLAY MONITOR AND A SCANNER DISPOSED BELOW THE DISPLAY MONITOR AND EXTENDING TO CROSS THE DISPLAY MONITOR, AND A BASE CONFIGURED TO SUPPORT THE SCANNER, THE BASE INCLUDING A FIRST PORTION AND A SECOND PORTION, WHERE THE FIRST PORTION AT LEAST PARTIALLY VERTICALLY OVERLAPPING THE DISPLAY MONITOR AND THE SCANNER

(71) Applicant: Seeminex.com, Inc., San Diego, CA (US)

(72) Inventor: Sukjoo Shin, Incheon (KR)

(73) Assignee: Seeminex.com, Inc., San Diego, CA (US)

( * ) Notice: Subject to any disclaimer, the term of this patent is extended or adjusted under 35 U.S.C. 154(b) by 0 days.

(21) Appl. No.: 16/837,729

(22) Filed: Apr. 1, 2020

Related U.S. Application Data

(60) Provisional application No. 62/881,168, filed on Jul. 31, 2019, provisional application No. 62/881,222, filed on Jul. 31, 2019.

(51) Int. Cl.
*H04N 1/00* (2006.01)
*G06F 3/16* (2006.01)

(52) U.S. Cl.
CPC ......... *H04N 1/00411* (2013.01); *G06F 3/167* (2013.01); *H04N 1/00241* (2013.01); *H04N 2201/0094* (2013.01)

(58) Field of Classification Search
USPC ................ 248/688, 693, 548–550, 566–574, 248/585–633, 637–678, 37.6, 511–541;
(Continued)

(56) References Cited

U.S. PATENT DOCUMENTS

2006/0203301 A1* 9/2006 Kojima ............. H04N 1/00519
358/474
2010/0118327 A1* 5/2010 Caspar ............. H04N 1/00519
358/1.13

(Continued)

*Primary Examiner* — Marcellus J Augustin
(74) *Attorney, Agent, or Firm* — Knobbe Martens Olson & Bear LLP

(57) ABSTRACT

A multi-function/multi-purpose portable electronic device is disclosed. In one aspect, the device may include a display monitor configured to display an image and a scanner disposed below the display monitor and extending to cross the display monitor, the scanner not directly contacting the display monitor. The device may also include a base configured to support the scanner, the base including a first portion having a first thickness and a second portion having a second thickness greater than the first thickness, the first portion at least partially vertically overlapping the display monitor and the scanner. The device may further include a speaker disposed only in the second portion of the base. The device may also include a connector physically interconnecting the base and the display monitor to support the display monitor, at least a portion of the connector vertically overlapping the second portion of the base.

24 Claims, 24 Drawing Sheets

(58) Field of Classification Search
USPC .............................. 358/1.1–3.29, 1.11–1.18
See application file for complete search history.

(56) References Cited

U.S. PATENT DOCUMENTS

| | | | |
|---|---|---|---|
| 2013/0176672 A1* | 7/2013 | Richard ................ | G06F 1/1616 |
| | | | 361/679.22 |
| 2014/0029069 A1* | 1/2014 | Mikami ................ | G07G 1/0018 |
| | | | 358/497 |
| 2016/0195904 A1* | 7/2016 | Kim ....................... | G06F 1/1654 |
| | | | 361/679.21 |
| 2016/0282905 A1* | 9/2016 | Laine .................. | H01R 13/6205 |
| 2018/0112815 A1* | 4/2018 | Kim ....................... | F16M 11/10 |

* cited by examiner

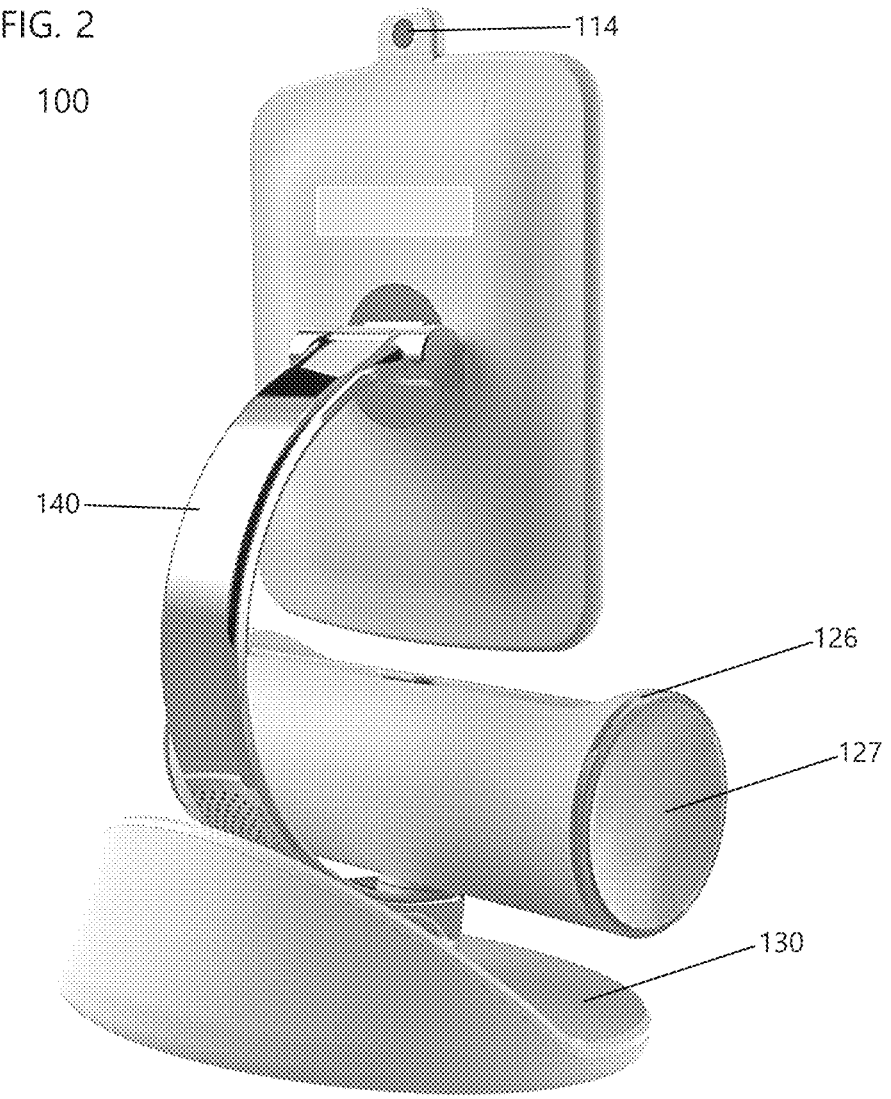

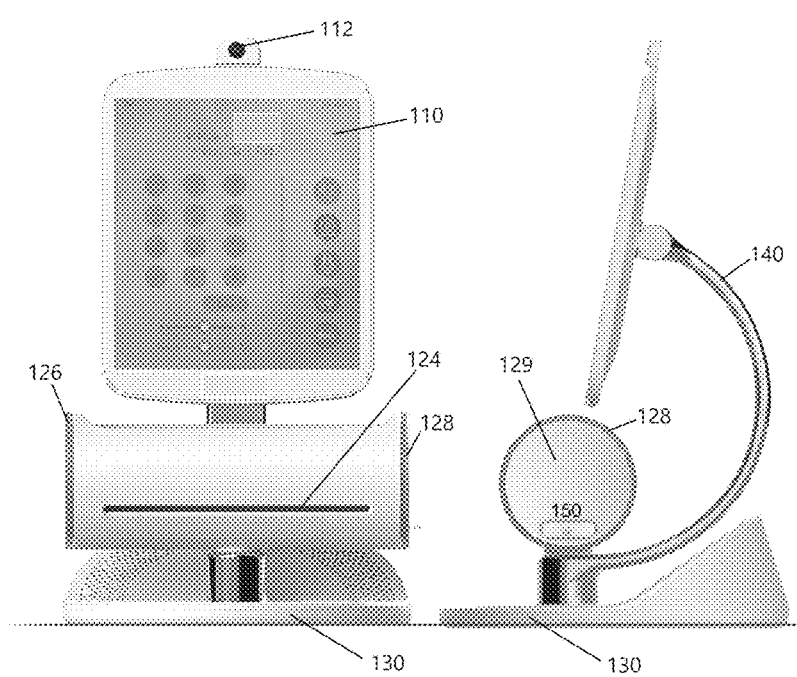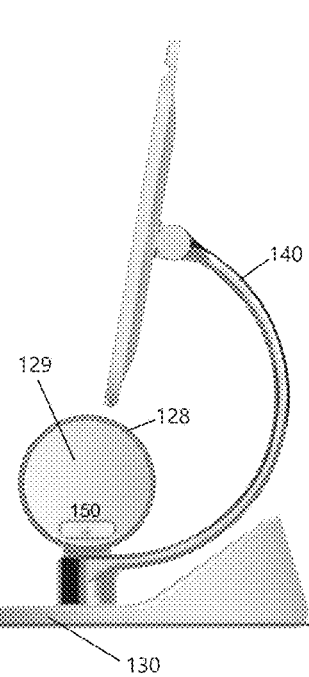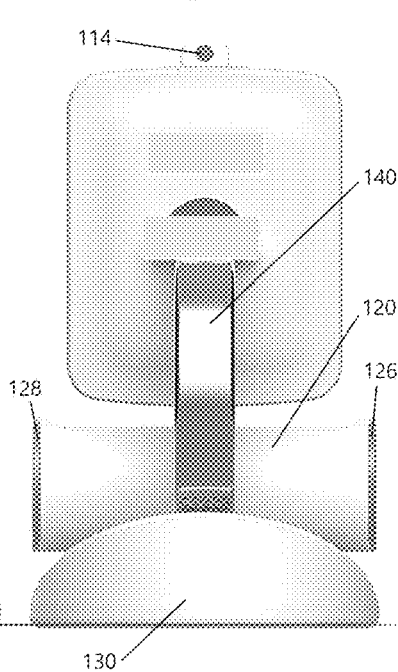

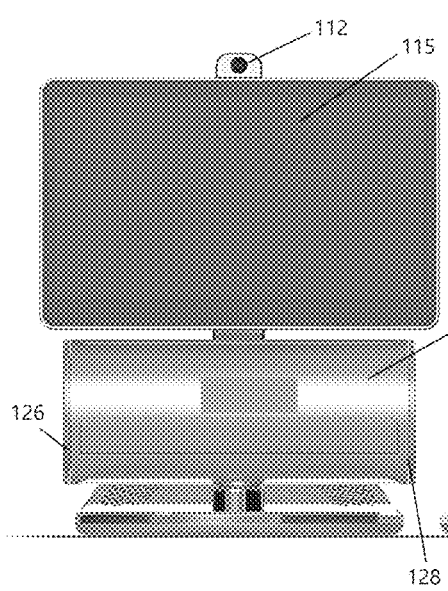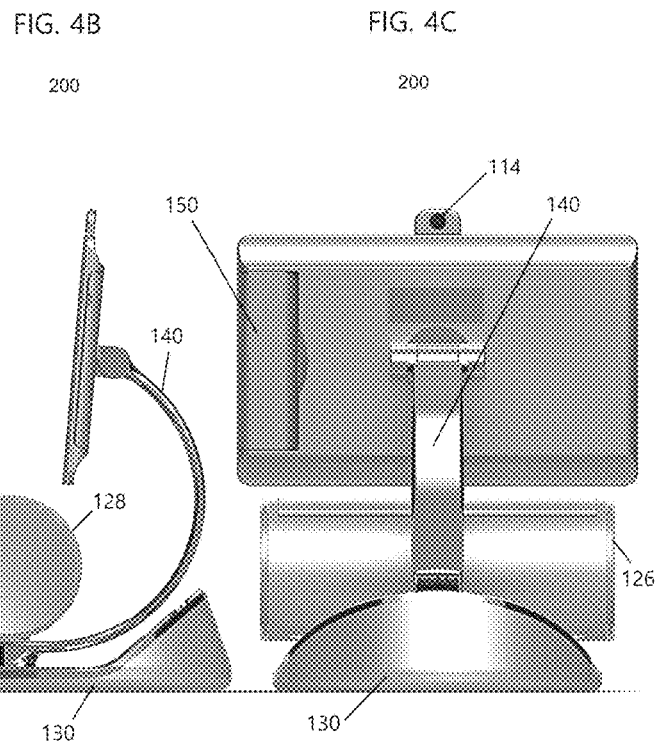
FIG. 4A  FIG. 4B  FIG. 4C

200

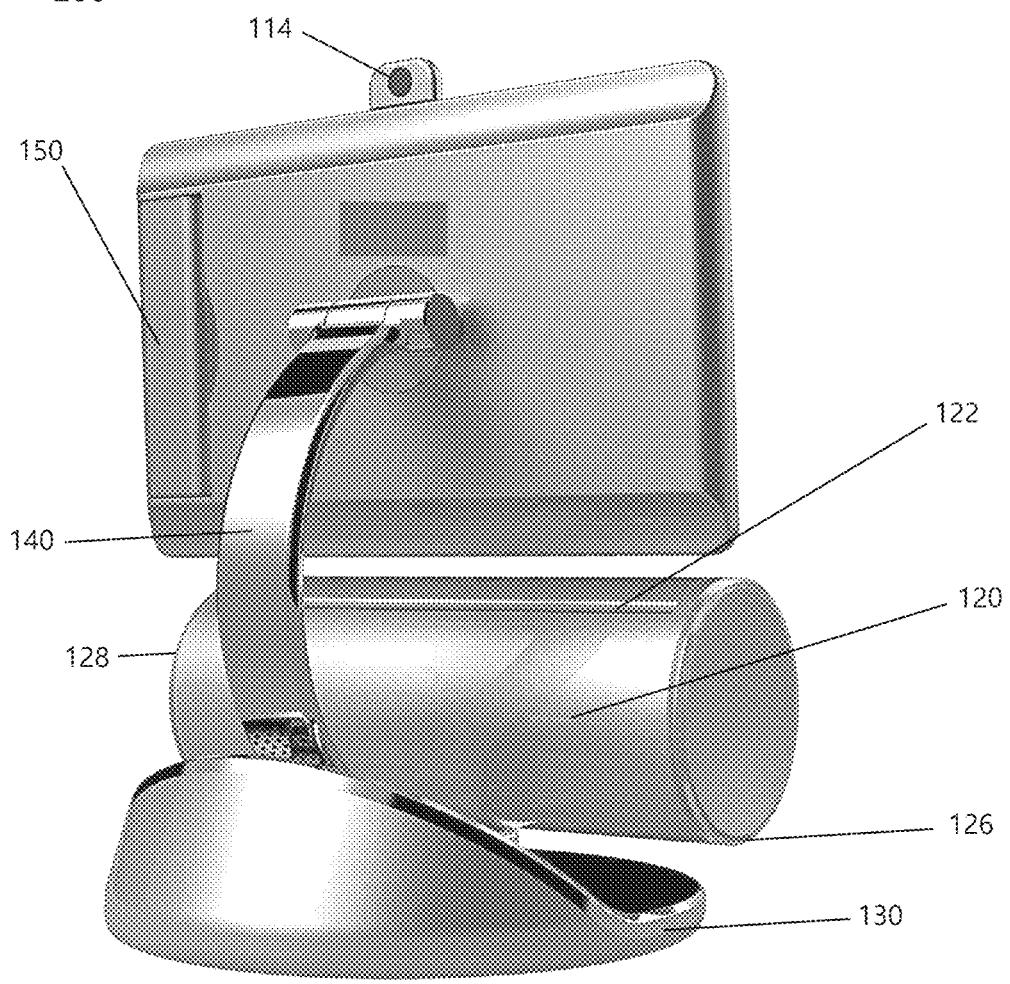

200

200

200

300

400

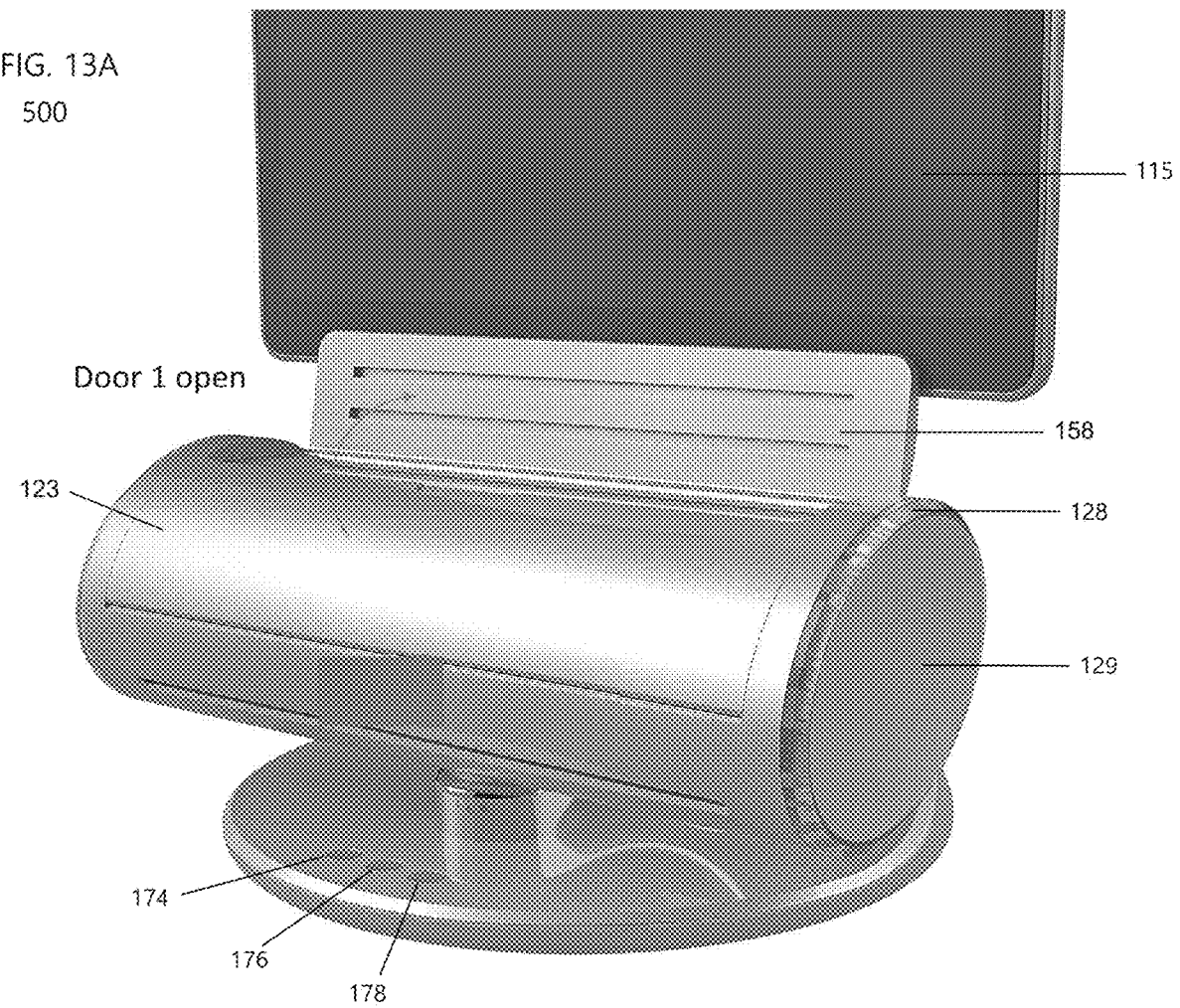

500

Door 2 open

600

600
Door 2 open

800

126/128

732

162/164

MULTI-PURPOSE/MULTI-FUNCTION PORTABLE ELECTRONIC DEVICE WHICH INCLUDES A DISPLAY MONITOR AND A SCANNER DISPOSED BELOW THE DISPLAY MONITOR AND EXTENDING TO CROSS THE DISPLAY MONITOR, AND A BASE CONFIGURED TO SUPPORT THE SCANNER, THE BASE INCLUDING A FIRST PORTION AND A SECOND PORTION, WHERE THE FIRST PORTION AT LEAST PARTIALLY VERTICALLY OVERLAPPING THE DISPLAY MONITOR AND THE SCANNER

RELATED APPLICATIONS

This application claims priority to and the benefit of Provisional Application Nos. 62/881,168 and 62/881,222, both filed on Jul. 31, 2019 in the U.S. Patent and Trademark Office, the entire contents of which are incorporated herein by reference.

BACKGROUND

Field

The described technology generally relates to multi-purpose and multi-function electronic portable device.

Description of the Related Technology

Up until recently, pictures were generally produced as physical prints. Once a consumer was done viewing photo prints, the images were stored in boxes or transferred into a physical storage media (i.e. disks, USB drive, etc.) using a traditional, stand-alone scanner. Furthermore, a portable information terminal such as a laptop, a tablet or a smartphone generally does not have a full scanner for scanning a document. Thus, a user is generally required to purchase a portable terminal and a scanner separately, which increases space and price and decreases portability.

SUMMARY

For purposes of summarizing the described technology and the advantages achieved over the prior art, certain objects and advantages of the described technology are described herein. Not all such objects or advantages may be achieved in any particular embodiment of the described technology. Thus, for example, those skilled in the art will recognize that the described technology may be embodied or carried out in a manner that achieves or optimizes one advantage or group of advantages as taught herein without necessarily achieving other objects or advantages as may be taught or suggested herein.

One inventive aspect is a multi-purpose and multi-function electronic portable device, comprising a display monitor including a display screen configured to display an image and a rear surface opposite to the display screen, a scanner disposed below the display monitor and configured to scan a document; the scanner including i) an elongated cylindrical body extending to cross the display monitor such that the elongated cylindrical body at least partially vertically overlaps the display monitor, ii) a first and a second touch pads respectively disposed on the first and second ends of the elongated cylindrical body opposing each other, and iii) a first and second light pipes surrounding the first and second touch pads and configured to emit light in different colors, the first and second touch pads configured to control the first and second pipes to change the colors from one color to another different color in response to sensing a touch on at least one of the first and second touch pads; a base disposed below the scanner, the base including a planar portion and an inclined portion thicker than the planar portion; the planar portion at least partially vertically overlapping the display monitor and the elongated cylindrical body of the scanner; a speaker disposed only in the inclined portion of the base and configured to output an audio sound; a scanner support extending from the planar surface of the base toward the scanner and configured to support the scanner; a power source disposed in the base and configured to supply power to the display monitor, the scanner and speaker; a curved connector extending from the scanner support and connected to the rear surface of the display monitor, the curved connector configured to electrically connect the power source to the display monitor, the curved connector curved to be concave with respect to the scanner and a portion of the rear surface of the display monitor, at least a portion of the curved connector disposed directly above the speaker and the inclined portion of the base, a lower portion of the curved connector curved toward the inclined portion of the base without contacting the inclined portion of the base, an upper portion of the curved connector not vertically overlapping the planar portion of the base; and a controller configured to control operations of at least one of the display monitor, the scanner, the first and second touch pads, the first and second light pipes, the speaker or the power source, the first and second light pipes configured to emit light based on the audio sound output from the speaker.

In certain embodiments, the first and second light pipes are configured to emit light having an intensity proportional to a volume of the audio sound output from the speaker.

In certain embodiments, the display monitor is configured to rotate horizontally and/or vertically.

In certain embodiments, the display monitor is configured to rotate vertically to convert between a vertical screen and a landscape screen.

In certain embodiments, the scanner comprises a document inlet configured to receive a document to be scanned and a document outlet configured to output a scanned document.

In certain embodiments, the document inlet is disposed closer to the display monitor than the document outlet, and the document outlet is disposed closer to the base than the document inlet.

In certain embodiments, the document inlet and the document outlet are disposed to be parallel to the elongated cylindrical body.

In certain embodiments, the speaker has a semicircular shape.

In certain embodiments, the multi-function/multi-purpose portable electronic device further comprises a handset disposed on the rear surface of the display monitor.

In certain embodiments, the multi-function/multi-purpose portable electronic device further comprises a handset disposed inside the elongated cylindrical body of the scanner.

In certain embodiments, at least one of the first and second touch pads has an opening configured to receive the handset.

In certain embodiments, the multi-function/multi-purpose portable electronic device further comprises a proximity sensor configured to sense a presence of a user and/or a touch sensor configured to sense a touch on the portable electronic device.

In certain embodiments, the multi-function/multi-purpose portable electronic device further comprises one or more device operation buttons disposed on at least one of the planar portion of the base or an outer surface of the elongated cylindrical body of the scanner.

In certain embodiments, one or more device operation buttons comprise at least one of a power on/off button, a volume button, a brightness button, a microphone on/off button, or a help button.

In certain embodiments, the multi-function/multi-purpose portable electronic device further comprises at least one camera disposed on or incorporated into the display monitor.

The multi-function/multi-purpose portable electronic device of Claim 15, wherein the at least one camera comprises a front camera disposed on or incorporated into the display screen.

In certain embodiments, at least one camera further comprises a rear camera disposed on or incorporated into the rear surface of the display monitor.

In certain embodiments, the multi-function/multi-purpose portable electronic device further comprises a first antenna for short range wireless communication and/or a second antenna for long range wireless communication disposed in the display monitor.

In certain embodiments, the inclined portion of the base has a thickness gradually increasing and gradually decreasing.

In certain embodiments, the inclined portion of the base directly faces a lower portion of the curved connector, and the lower portion of the curved connector is curved such that a gap between the lower portion of the curved connector and the inclined portion of the base varies.

Another aspect is a multi-function/multi-purpose portable electronic device, comprising a display monitor including a display screen configured to display an image and a rear surface opposite to the display screen; a scanner disposed below the display monitor, the scanner including a body extending to cross the display monitor and one or more light pipes disposed on a side of the body and configured to emit light; a base disposed below the scanner, the base including a planar portion and an inclined portion; the planar portion at least partially vertically overlapping the display monitor and the body of the scanner; a scanner disposed below the display monitor; the scanner including a body extending to cross the display monitor and one or more light pipes disposed on a side of the body and configured to emit light; a speaker disposed in the inclined portion of the base and configured to output an audio sound; a scanner support extending from the planar portion of the base toward the scanner to support the scanner; a curved connector extending from the scanner support and connected to the rear surface of the display monitor, at least a portion of the curved connector disposed directly above the speaker and the inclined portion of the base; and a controller configured to control operations of at least one of the display monitor, the speaker or the scanner, the one or more light pipes configured to emit light based on the audio sound output from the speaker.

In certain embodiments, the scanner further comprises at least one touch pad disposed on the side of the body and configured to emit light in different colors, the at least one touch pad configured to control the one or more light pipes to change the colors from one color to another different color in response to sensing a touch on the at least one touch pad.

In certain embodiments, lower portion of the curved connector is curved toward the inclined portion of the base without contacting the inclined portion of the base, and wherein an upper portion of the curved connector does not vertically overlap the planar portion of the base.

In certain embodiments, the inclined portion of the base directly faces a lower portion of the curved connector, and wherein the lower portion of the curved connector is curved such that a gap between the lower portion of the curved connector and the inclined portion of the base varies.

Yet another aspect is a multi-function/multi-purpose portable electronic device, comprising: a display monitor configured to display an image; a scanner disposed below the display monitor and extending to cross the display monitor, the scanner not directly contacting the display monitor; a base configured to support the scanner, the base including a first portion having a first thickness and a second portion having a second thickness greater than the first thickness, the first portion at least partially vertically overlapping the display monitor and the scanner; a speaker disposed only in the second portion of the base; and a connector physically interconnecting the base and the display monitor to support the display monitor, at least a portion of the connector vertically overlapping the second portion of the base.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. Same reference numerals will be used for same elements throughout the disclosure.

FIGS. 1 and 2 are example perspective views of a multi-function/multi-purpose portable electronic device in accordance with aspects of this disclosure.

FIGS. 3A, 3B and 3C are example front, side and rear views of a multi-function/multi-purpose portable electronic device in accordance with some aspects of this disclosure.

FIGS. 4A, 4B and 4C are example front, side and rear views of a multi-function/multi-purpose portable electronic device in accordance with other aspects of this disclosure.

FIG. 6 is an example rear perspective view of the multi-function/multi-purpose portable electronic device of FIG. 5 in accordance with aspects of this disclosure.

FIGS. 13A and 13B are example perspective views of a multi-function/multi-purpose portable electronic device with scanner doors opened in accordance with aspects of this disclosure.

DETAILED DESCRIPTION

In the following description, for purposes of explanation, numerous specific details are set forth in order to provide a thorough understanding of this application. It will be evident, however, to one of ordinary skill in the art that this device and its various functions may be operated for multiple purposes, not all enumerated herein.

As described in various example embodiments, multi-function/multi-purpose portable electronic devices are described herein. Although the example embodiments are described with respect to a multi-function/multi-purpose portable electronic device for the purpose of convenience of description, the described technology can be applied to a non-portable or stationary electronic device for multiple uses, not all enumerated herein.

Figure 1:
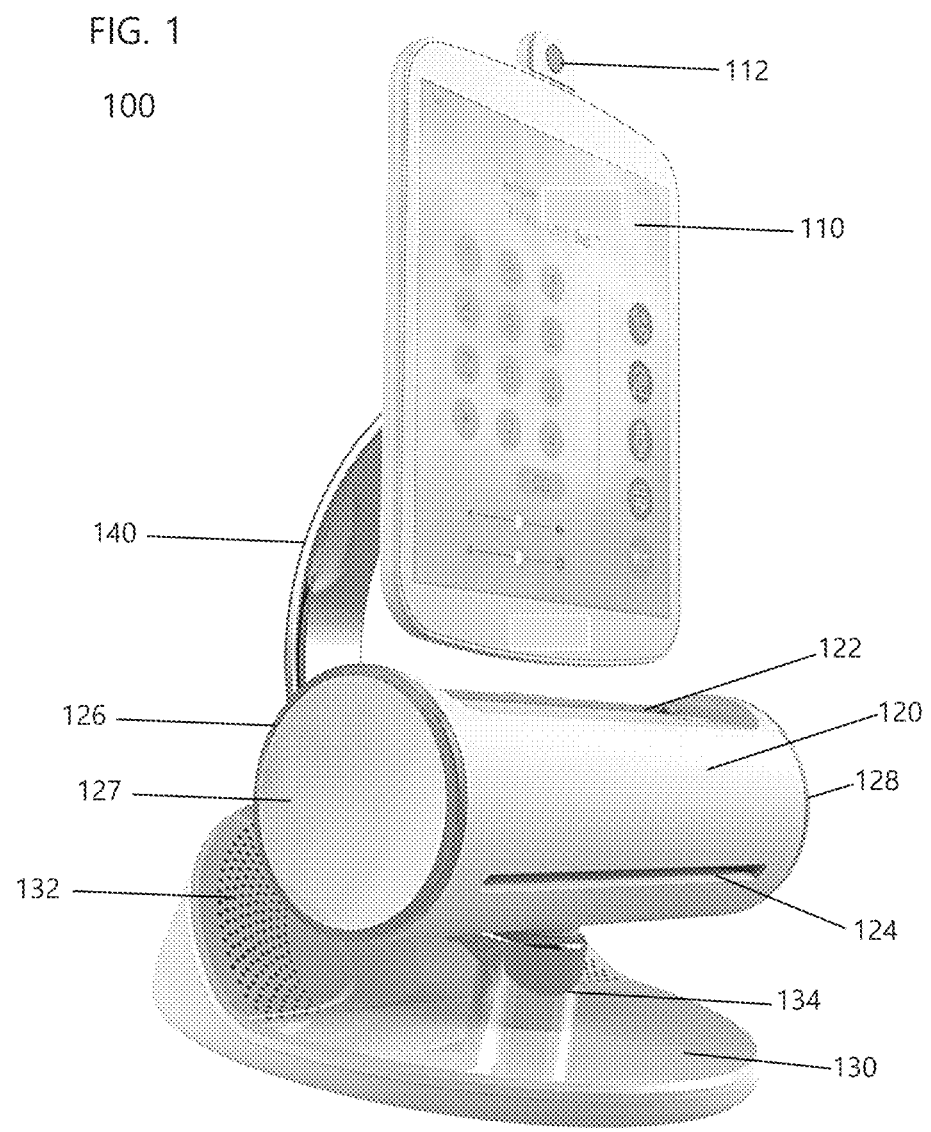

FIGS. 1 and 2 are example perspective views of a multi-function/multi-purpose portable electronic device 100 in accordance with aspects of this disclosure. As illustrated in FIGS. 1 and 2, the device 100 can be embodied as a portable electronic device. The device 100 may include a display monitor 110, a front camera 112 and a rear camera 114, a scanner 120, a base 130, a speaker 132, a scanner support 134, and a connector 140.

The multi-function/multi-purpose portable electronic device 100 shown in FIGS. 1 and 2 is merely an example, and can have different structures, shapes, configurations, and/or designs. Certain components may be removed or others can be added. For example, the scanner support 134 may be removed and/or the display screen 110 may have different designs and/or arrangements of input touch pads and/or buttons. The display monitor 110 may include a display screen (FIG. 1) configured to display an image and a rear surface (FIG. 2) opposite to the display screen. In some embodiments, the display monitor 110 may be configured to rotate horizontally and/or vertically to be converted between a vertical screen (see FIGS. 1 and 2, for example) and/or a landscape screen (see FIGS. 4A-9 and 11-14B, for example). The display screen of the display monitor 110 can include one or more buttons (not shown) for controlling certain characteristics of the display monitor 110 such as contrast or brightness, etc. The display monitor 110 may be a touch screen, or may, be operated by a handset 150 or activated by one or more sensors (to be described in greater detail with reference to FIGS. 15 and 16). In some implementations, the display monitor 110 may be configured to not accept touch inputs. In these embodiments, the display monitor 110 may include at least one of physical buttons, switches, dials, sliders, keys or keypad, a navigation pad, and the like.

The display monitor 110 may be of any size and its orientation may be adjustable. For example, the angle between the connector 140 and the display monitor 110 may be tilted up or down to allow for easier viewing of the display screen.

The scanner 120 may be disposed below the display monitor 110 and configured to scan a document. The scanner 120 can include an elongated body extending to cross the display monitor 110 such that the elongated body 110 can partially vertically, overlap the display monitor 110. The body of the scanner 120 may have a cylindrical shape. However, the scanner 120 may have other shapes.

The scanner 120 can also include one or more touch pads 127/129 respectively disposed at either or both ends of the body of the scanner 120. The scanner 120 may also include one or more light pipes 126/128 surrounding the touch pads 127/129. The light pipes 126/128 may be configured to emit light in different colors in response to sensing a touch on one or more of the touch pads 127/129. For example, one or more of the touch pads 127/129 may be configured to control the light pipes 126/12.8 to change the colors from one color (e.g., blue) to another different color (e.g., yellow) in response to sensing a touch on at least one of the touch pads 127/129. The light pipes 126/18 may be attached to a different part of the scanner 120 or other components of the device 100. The light pipes 126/128 may be configured to emit light having an intensity generally proportional (or disproportionate) to a volume of the audio sound output from the speaker 132. The light intensity output from the light pipes 126/128 may not be related to a volume of the audio sound output from the speaker 132 and may be randomly output.

The scanner 120 may also include a document inlet 122 and a document outlet 24. The document inlet 122 may receive a document to be scanned. The document outlet 124 may output a document which has been scanned. For example, when a document sheet is inserted in the scanner inlet 122, the document image can be read and moved forward to the document outlet 124, In some embodiments, the scanner 120 may include a single document convey path (or opening). For example, when a document is inserted in the convey path for reading and the read operation is finished, the document may be reversed so that the document sheet is returned to the insert position through the convey path. The document inlet 122 may be disposed closer to the display monitor 110 than the document outlet 124. The document outlet 124 may be disposed closer to the base 130 than the document inlet 122. In some embodiments, the document inlet 122 and the document outlet 124 may be disposed to be substantially parallel to the elongated body of the scanner 120. In other embodiments, the document inlet and outlets 122 and 124 may not be parallel to the elongated body of the scanner 120.

The base 130 may be disposed below the scanner 120. The base 130 may include a planar portion and an inclined portion thicker than the planar portion. The planar portion may at least partially vertically overlap the display monitor 110 and the elongated body of the scanner 120. The inclined portion of the base 130 can gradually increase in thickness to provide stability of the device 100. For example, the thicker inclined portion may at least partially offset a front-heavy configuration of the device 100 due to the relatively heavier components such as the display monitor 110 and the scanner 120 disposed at a front side (planar portion) of the base 130.

The speaker 132 may be disposed in the inclined portion of the base 130 to provide better sound quality to users compared to being disposed in the planar portion of the base 130 under the scanner 120. For example, the speaker 132 (disposed in the inclined portion) can provide more direct audio output to a user (e.g., in an inclined direction to a user) compared to an audio output in a vertical direction when the speaker is disposed in the planar portion. However, in some embodiments, at least a portion of the speaker 132 may be disposed in the planar portion of the base 130. The speaker 132 may have a substantially semicircular shape in its cross-section.

The scanner support 134 may extend from the planar surface of the base 130 toward the scanner 120 to support the scanner 120. The device 100 may also include a power source (see FIGS. 15 and 16) configured to supply power to the components of the device 100. The power source may be disposed inside the base 130. The scanner support 134 may house electrical components for transferring power from the power supply to the remaining components of the device 100.

The device 100 may also include a connector 140 extending from the scanner support 134 and connected to the rear surface of the display monitor 110. In some embodiments, the connector 140 may be curved. In other embodiments, the connector may not be curved. In some embodiments, the connector 140 can be of any shape and form (i.e. a spiral wire connector). Furthermore, the connector 140 may not be concave with respect to the scanner 120 and the rear surface of the display monitor 110. The connector 140 may be configured to electrically connect the power source in the base 130 to the display monitor 110. The connector 140 may be curved to be concave with respect to the scanner 120 and a portion of the rear surface of the display monitor 110. At least a portion of the connector 140 may be disposed directly above the speaker 132 and the inclined portion of the base 130.

In certain embodiments, the inclined portion of the base 130 may directly face a lower portion of the connector 140. The lower portion of the connector 140 may be curved such that a gap between the lower portion of the connector 140 and the inclined portion of the base 130 varies (see, for example, FIG. 3B).

The front camera 112 may be disposed on the front side of the display monitor 110 and the rear camera 114 may be disposed on the rear surface of the display monitor 110. At least one of the front and rear cameras 112 and 114 may be incorporated into the display screen of the display monitor 110. The front camera 112 can be a camera for performing a self-shooting function, and the rear camera 114 can be a camera for performing a general shooting function such as a landscape. The cameras 112 and 114 can be switched or activated manually, using a handset 150 or automatically via motion sensors 734, proximity/light sensors 732, and/or touch pad sensors 162/164. In some implementations, one camera may be used interchangeably to perform the multiple functions of the front camera 112 and the rear camera 114.

Other components of the device 132 such as a controller (not shown in FIGS. 1 and 2) will be described with reference to the block diagrams of FIGS. 15 and 16.

FIGS. 3A, 3B and 3C are example front, side and rear views of the multi-function/multi-purpose portable electronic device 100 in accordance with some aspects of this disclosure. Referring to FIG. 3B, a lower portion of the connector 140 may be curved toward the inclined portion of the base 130 without contacting the inclined portion of the base 130. An upper portion of the connector 140 may not vertically overlap the planar portion of the base 130. In some embodiments, as shown in FIG. 3B, the device 100 may include a handset 150 disposed inside the elongated body of the scanner 120. In these embodiments, at least one of the touch pads 127/129 may include an opening therein configured to receive the handset 150. The handset 150 may be used to control one or more components of the device 100.

FIGS. 4A, 4B and 4C are example front, side and rear views of a multi-function/multi-purpose portable electronic device 200 in accordance with other aspects of this disclosure. The device 200 may include a display monitor 115 and the handset 150. The main differences between the device 200 of FIGS. 4A-4C and the device 100 of FIGS. 3A-3C are the configuration of the display monitor and the position of the handset 150. For example, in the embodiment of FIGS. 3A-3C, the display monitor 110 has a vertical configuration, whereas in the embodiment of FIGS. 4A-4C, the display monitor 115 has a landscape configuration. Furthermore, the handset 150 of the device 100 is disposed in the body of the scanner 120, whereas the handset 150 of the device 200 is disposed on the rear surface of the display monitor 115.

Figure 5:
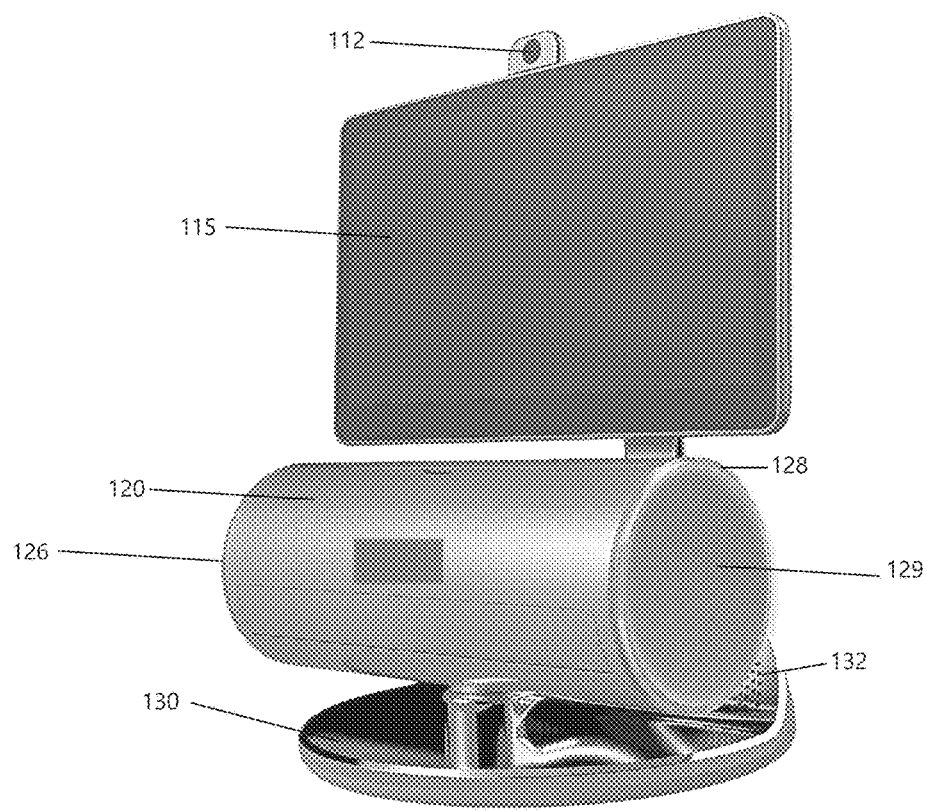
FIG. 5 is an example front perspective view of the multi-function/multi-purpose portable electronic device of FIGS. 4A-4C in accordance with aspects of this disclosure.

FIG. 5 is an example front perspective view of the multi-function/multi-purpose portable electronic device 200 of FIGS. 4A-4C in accordance with some aspects of this disclosure.

FIG. 6 is an example rear perspective view of the multi-function/multi-purpose portable electronic device 200 of FIG. 5 in accordance with some aspects of this disclosure. FIGS. 5 and 6 merely show different perspectives of the multi-function/multi-purpose portable electronic device 200 of FIGS. 4A-4C.

Figure 7A:
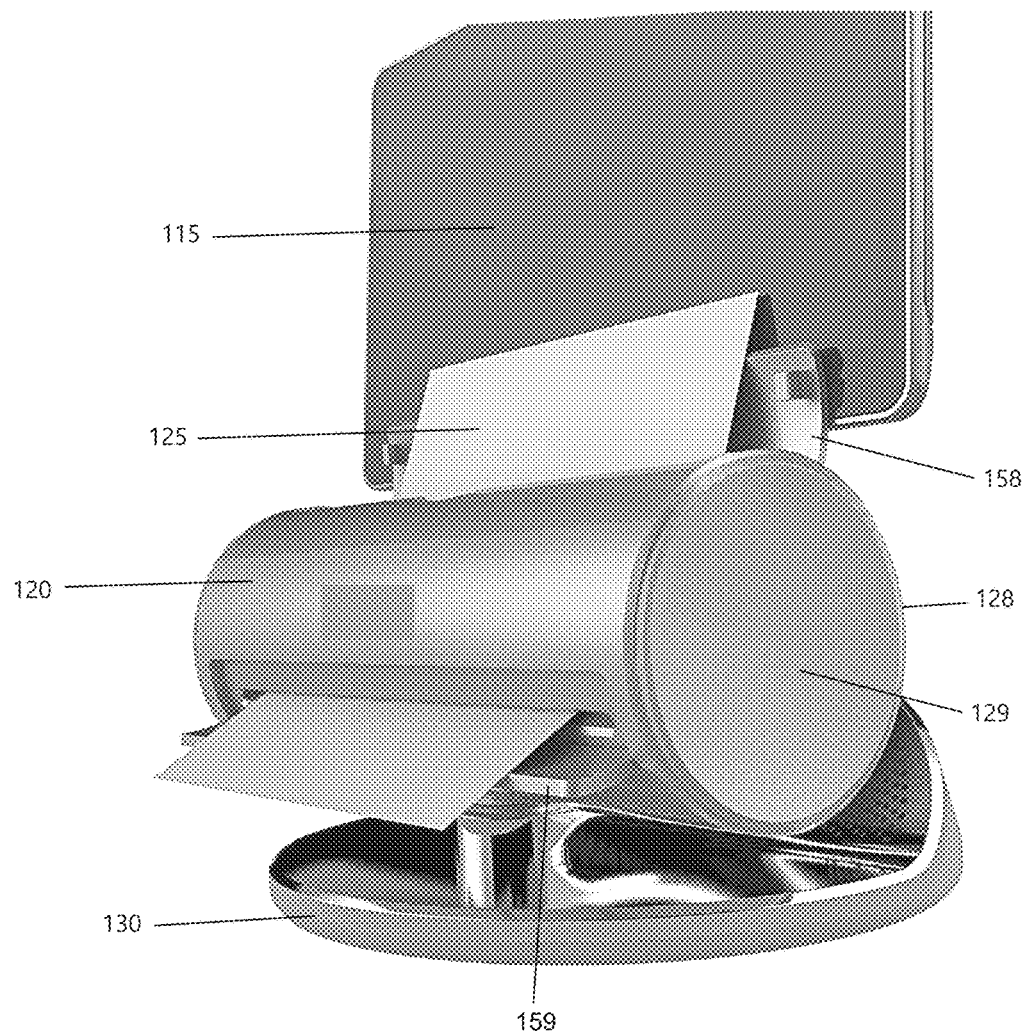
FIGS. 7A and 7B are example perspective views of the multi-function/multi-purpose portable electronic device of FIG. 5 with a document inserted for scanning in accordance with aspects of this disclosure.
Figure 7B:
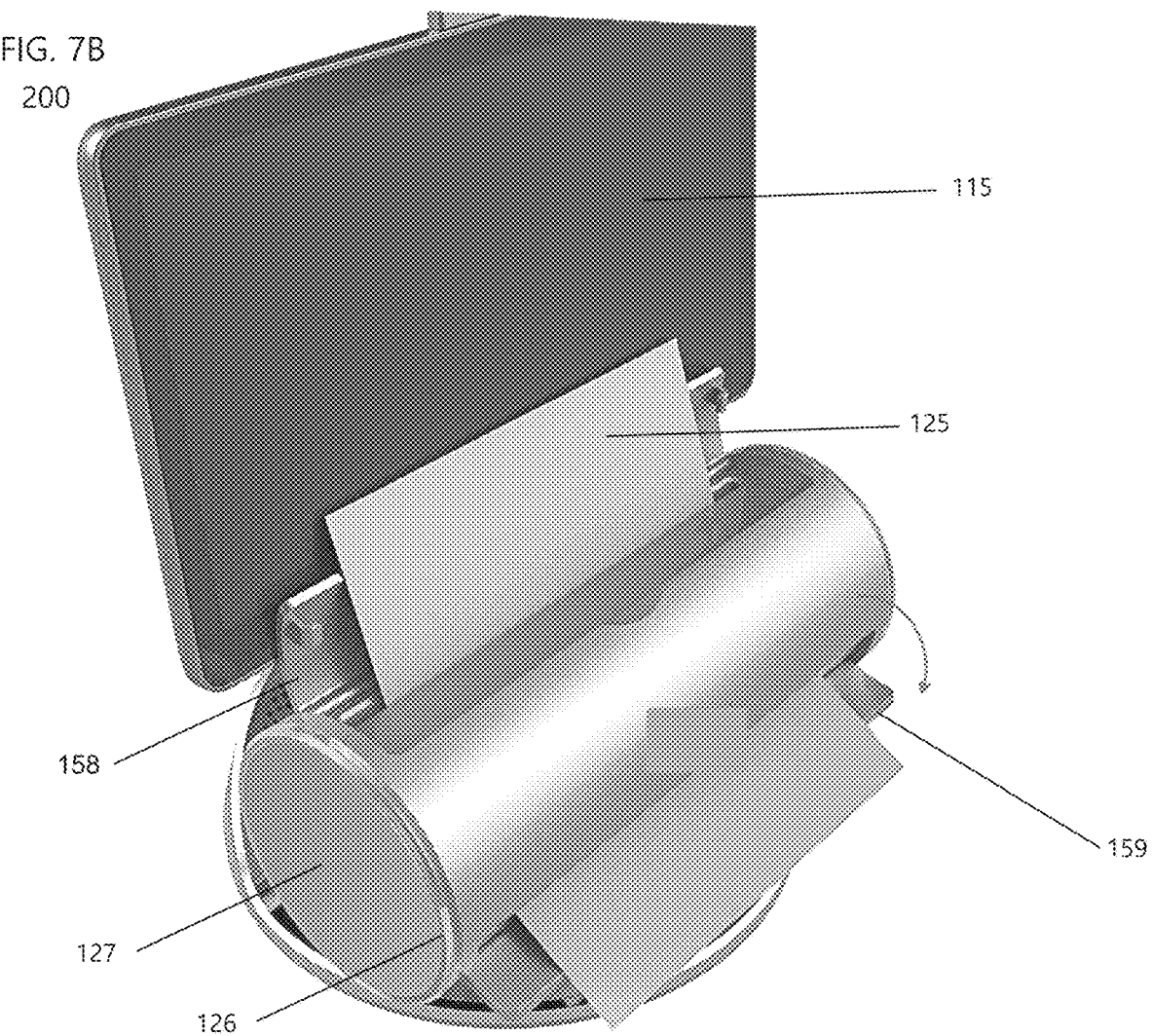

FIGS. 7A and 7B are example perspective views of the multi-function/multi-purpose portable electronic device 200 of FIG. 5 with a document 125 inserted for scanning in accordance with aspects of this disclosure. In certain implementation, the scanner 120 can include an opening door 158 on a top side of the scanner 120 and a closing door 159 on a bottom side of the scanner 120 which are configured to open and close when in use/not in use. The document 125 may be inserted into the document inlet 122 and output from the document outlet 124 once an upper cover 158 and a lower cover 159 of the scanner 120 are opened. The opening/ closing of the scanner doors 158/159 may be manual, automatic, voice or handset controlled.

Figure 8:
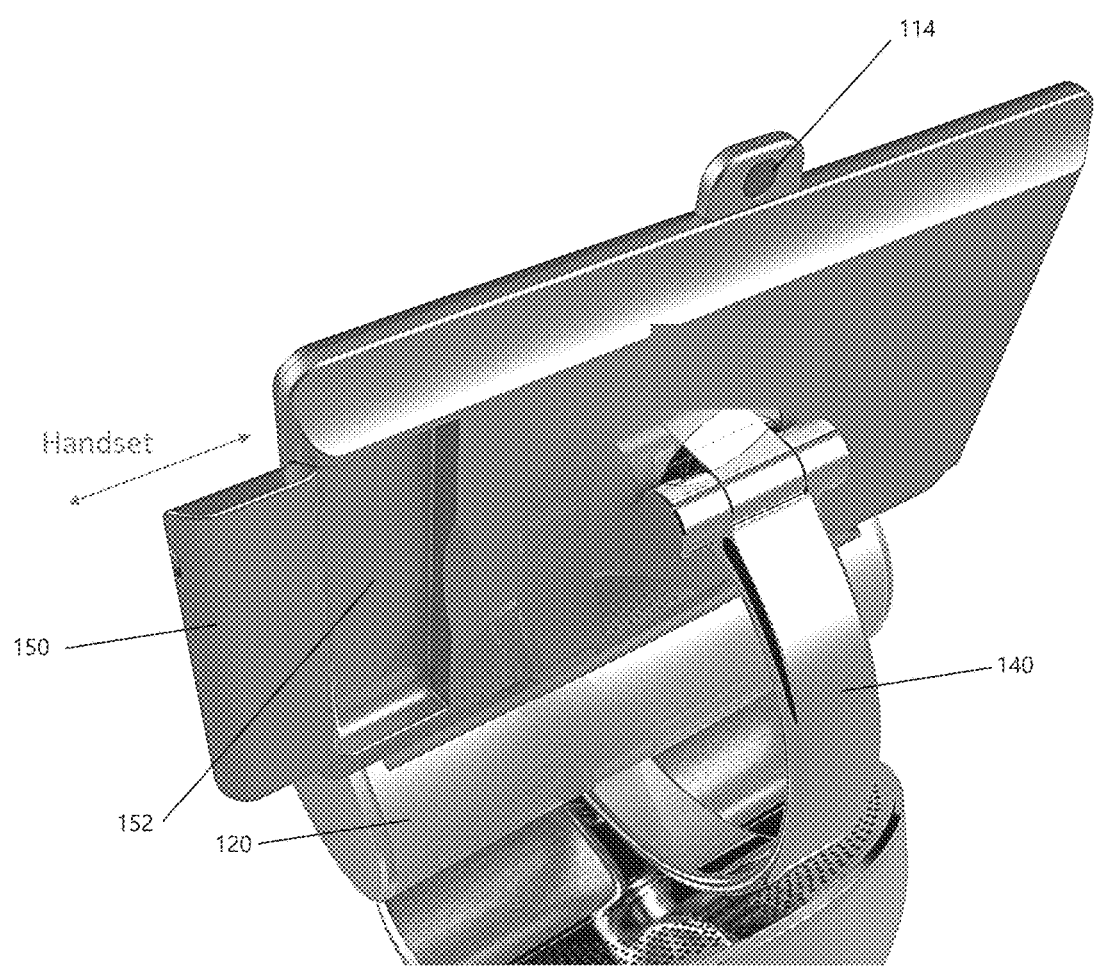
FIG. 8 is an example rear perspective view of the portable multi-function/multi-purpose device of FIG. 5 with a handset housed on the rear surface of the display monitor in accordance with aspects of this disclosure.

FIG. 8 is an example rear perspective view of the portable multi-function/multi-purpose device 200 with the handset 150 housed on the rear surface of the display monitor 115 in accordance with aspects of this disclosure. The handset 150 may be slid into a handset accommodation slot or groove 152 to be housed, and slid out of the slot 152 to be removed therefrom.

Figure 9:
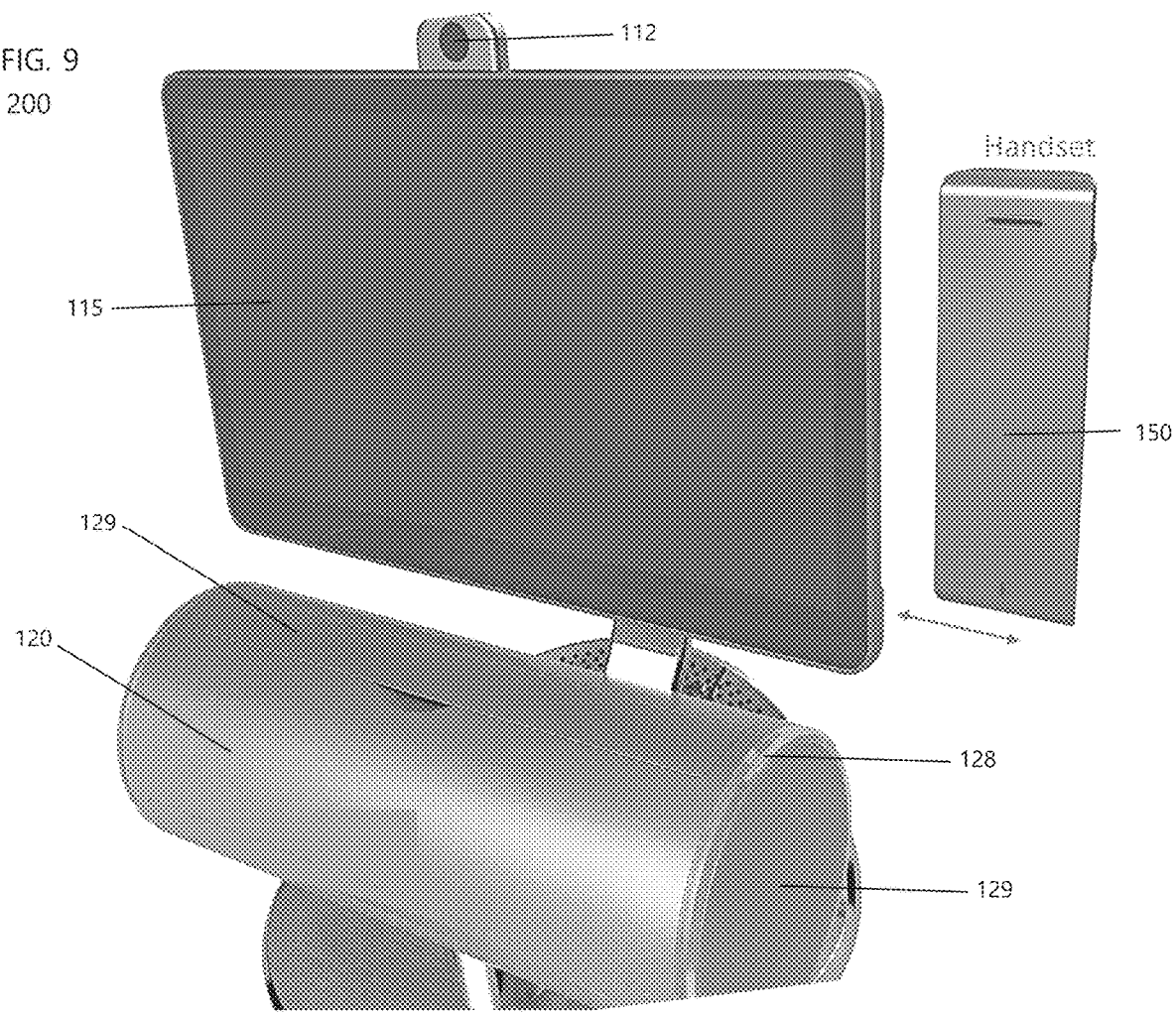
FIG. 9 is an example perspective view of the multi-function/multi-purpose portable electronic device of FIG. 5 with the handset removed in accordance with aspects of this disclosure.

FIG. 9 is an example perspective view of the multi-function/multi-purpose portable electronic device 200 with the handset 150 removed from the handset accommodation slot or groove 152 in accordance with aspects of this disclosure. Although not shown in FIG. 9, the handset 150 may be housed inside the body of the scanner 120 via an opening formed in one or more of the touch pads 127/129 of the scanner 120 of the device 200.

Figure 10:
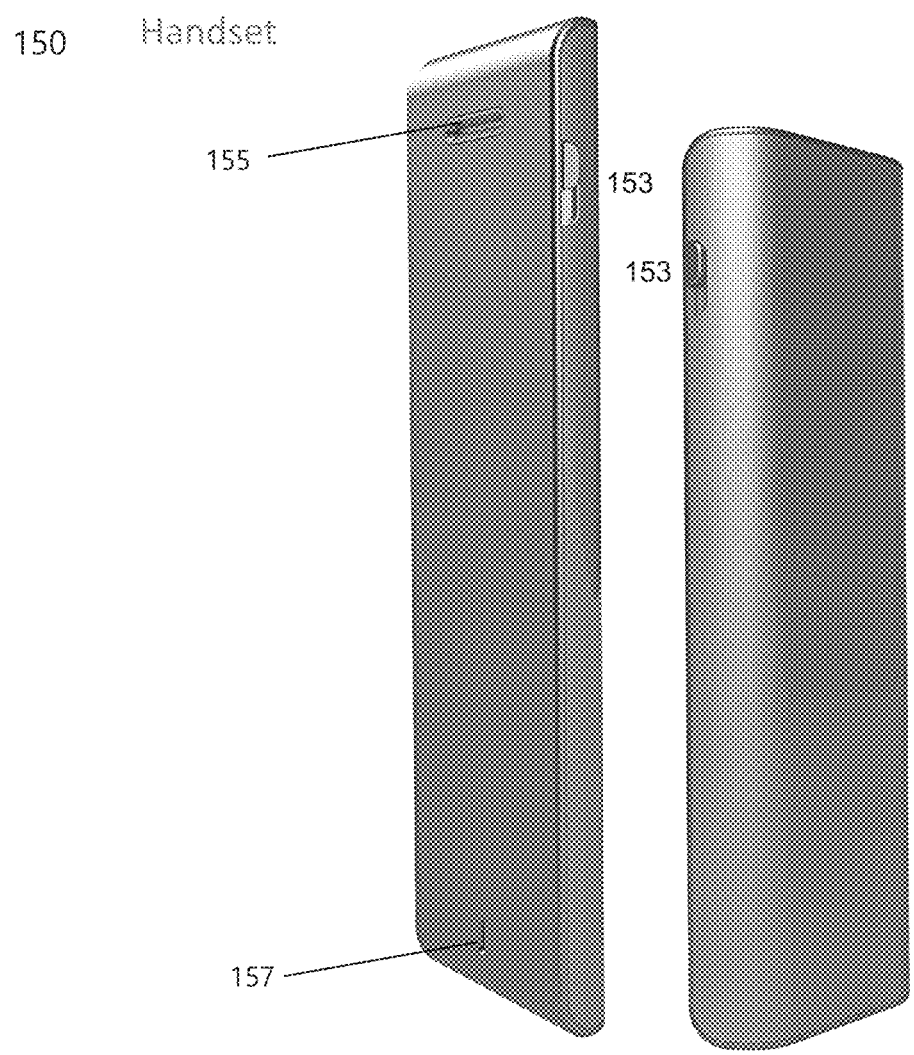
FIG. 10 shows example front and rear perspective views of the handset of the multi-function/multi-purpose portable electronic device in accordance with aspects of this disclosure.

FIG. 10 shows example front and rear perspective views of the handset 150 of the multi-function/multi-purpose portable electronic device 200 in accordance with aspects of this disclosure. The handset 150 may include a power on/off button 153 located on the side of the handset 150, a speaker 155 and a microphone 157. FIG. 10 shows only example locations of the components 153, 155 and 157, and one or more of the components 153, 155 and 157 can be disposed in other locations. Furthermore, other functional buttons or components (not shown) may also be disposed in the handset 150. The handset 150 may be configured to enable a user to control the device 100. For example, the handset 150 may receive a user command using voice recognition. The handset 150 may be hard-wired or wirelessly connected to the device 100 or an Internet communication device (not shown). The handset 150 may also include an antenna 154 for a long distance call (see FIG. 15). The handset may also include an antenna for short distance communication.

Figure 11:
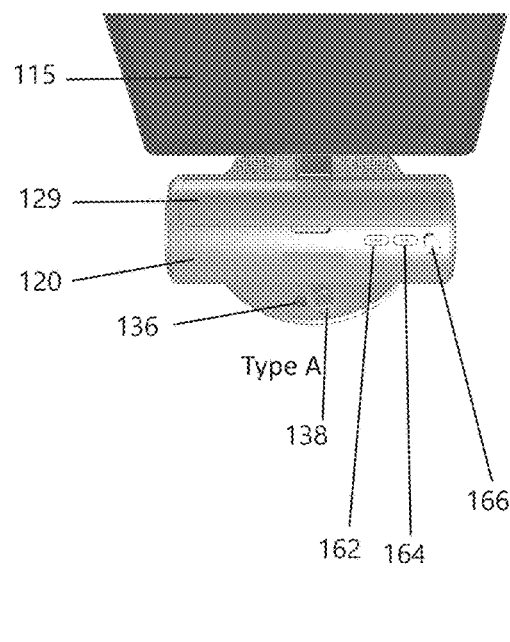
FIG. 11 illustrates an example multi-function/multi-purpose portable electronic device with functional buttons shown in accordance with some aspects of this disclosure.

FIG. 11 illustrates an example multi-function/multi-purpose portable electronic device 300 with some functional buttons shown in accordance with some aspects of this disclosure. The device 300 may include one or more functional buttons 136, 138 and 162-166. In some embodiments, as shown in FIG. 11, two of the functional buttons (136, 138) are disposed in the base 130 and three of the functional buttons (162-166) are disposed in the body of the scanner 120. However, at least one of the two buttons 136 and 138 may be disposed in the scanner 120 or other portions of the device 300. Furthermore, at least one of the three buttons 162-166 may be disposed in the base 130. These operation buttons 136, 138 and 162-166 may include a power on/off button, a volume button, a brightness button, a microphone on/off button, a help button and more. In some embodiments, other functional buttons may also be added. In other embodiments, at least one of the buttons 136, 138 and 162-166 may be removed. Furthermore, at least two of the buttons 136, 138 and 162-166 may be combined into a single button. This may apply to the embodiment of FIG. 12.

Figure 12:
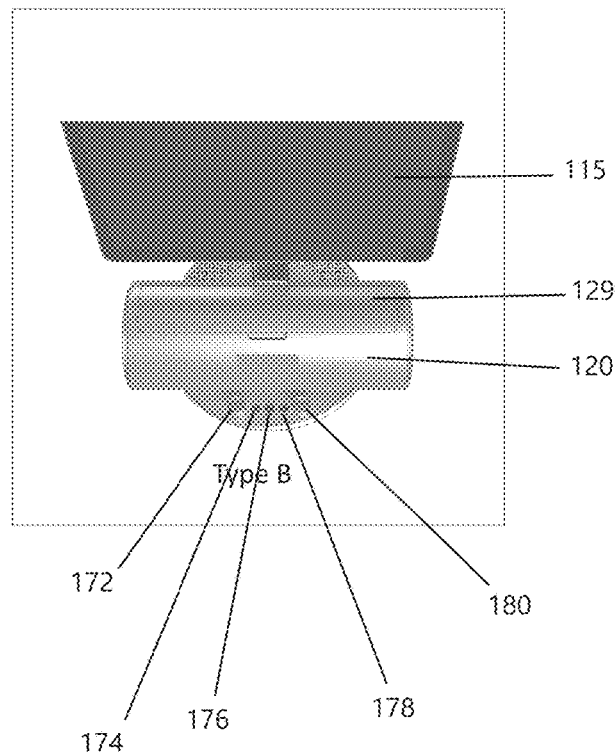
FIG. 12 illustrates another example multi-function/multi-purpose portable electronic device with functional buttons shown in accordance with other aspects of this disclosure.

FIG. 12 illustrates another example multi-function/multi-purpose portable electronic device 400 with functional buttons shown in accordance with other aspects of this disclosure. The device 400 may include one or more functional buttons 172-180. Although the buttons 172-180 are disposed in the base 130, at least one of the functional buttons 172-180 may be disposed in the scanner 120 or other portions of the device 400.

Figure 13B:
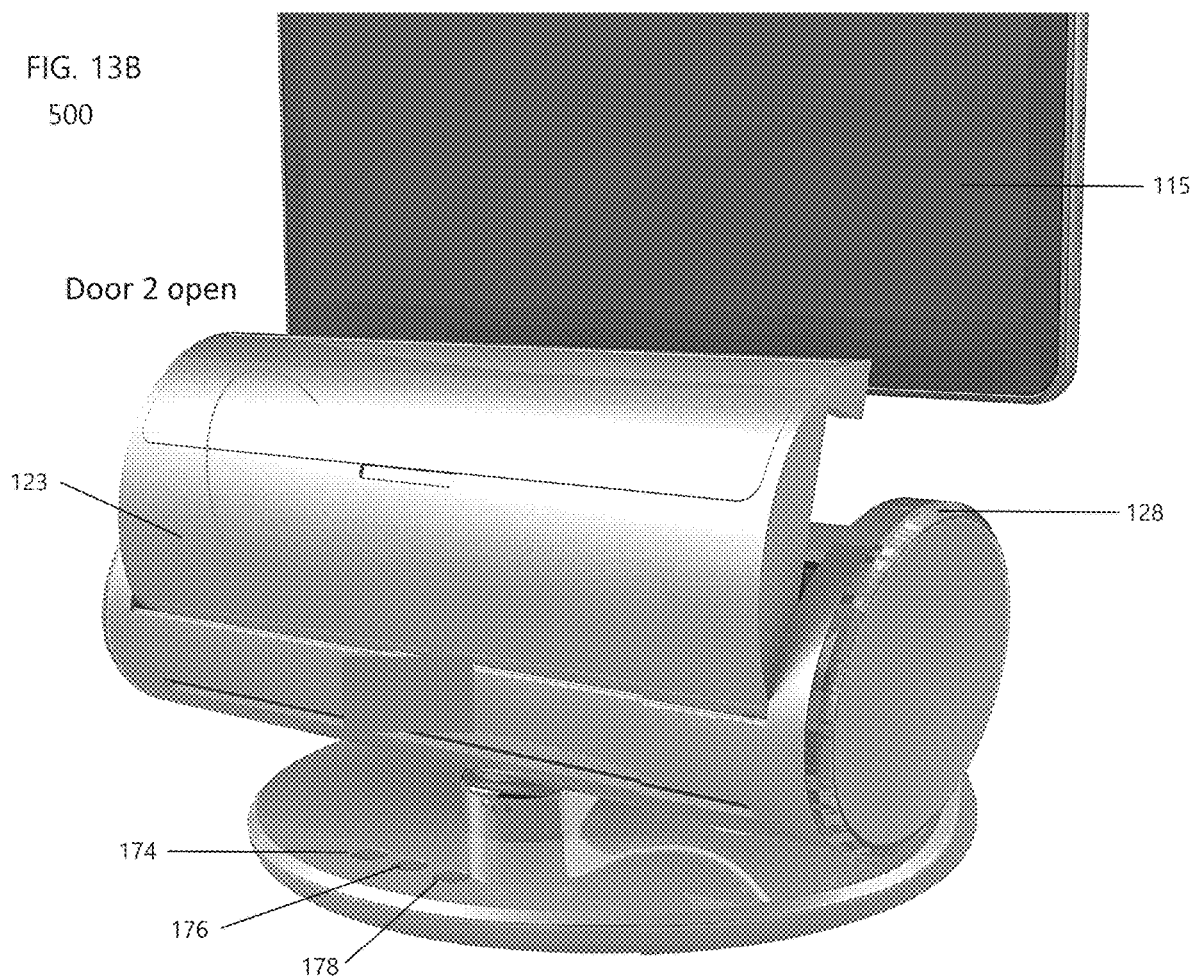
Figure 14A:
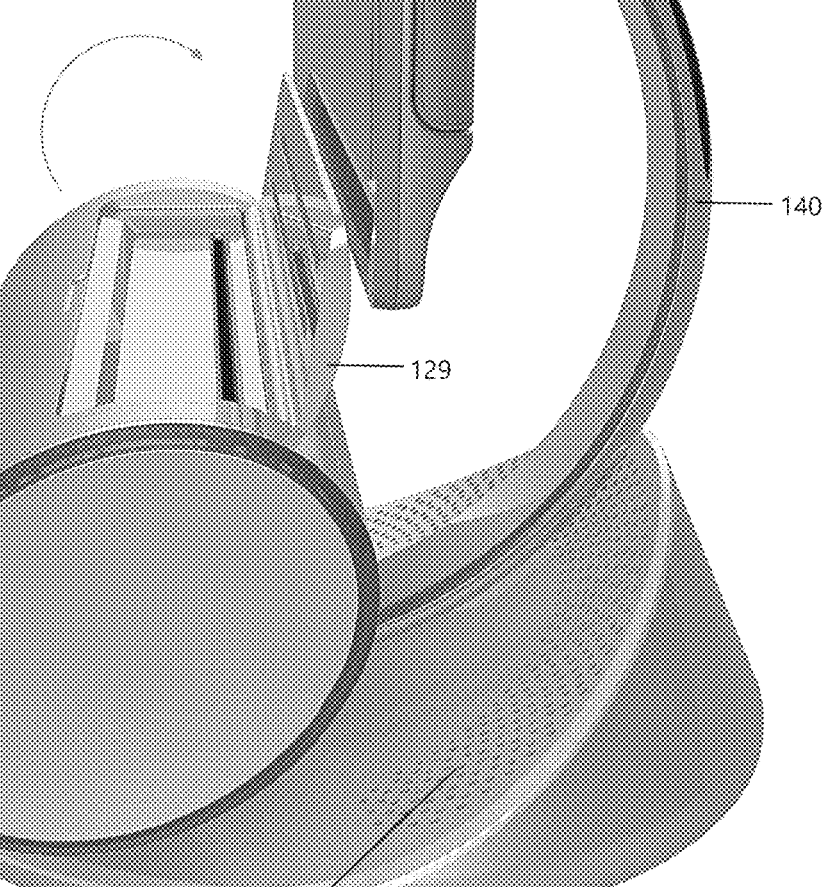
FIGS. 14A and 14B show different perspective views of the configuration of FIGS. 13A and 13B in accordance with aspects of this disclosure.
Figure 14B:
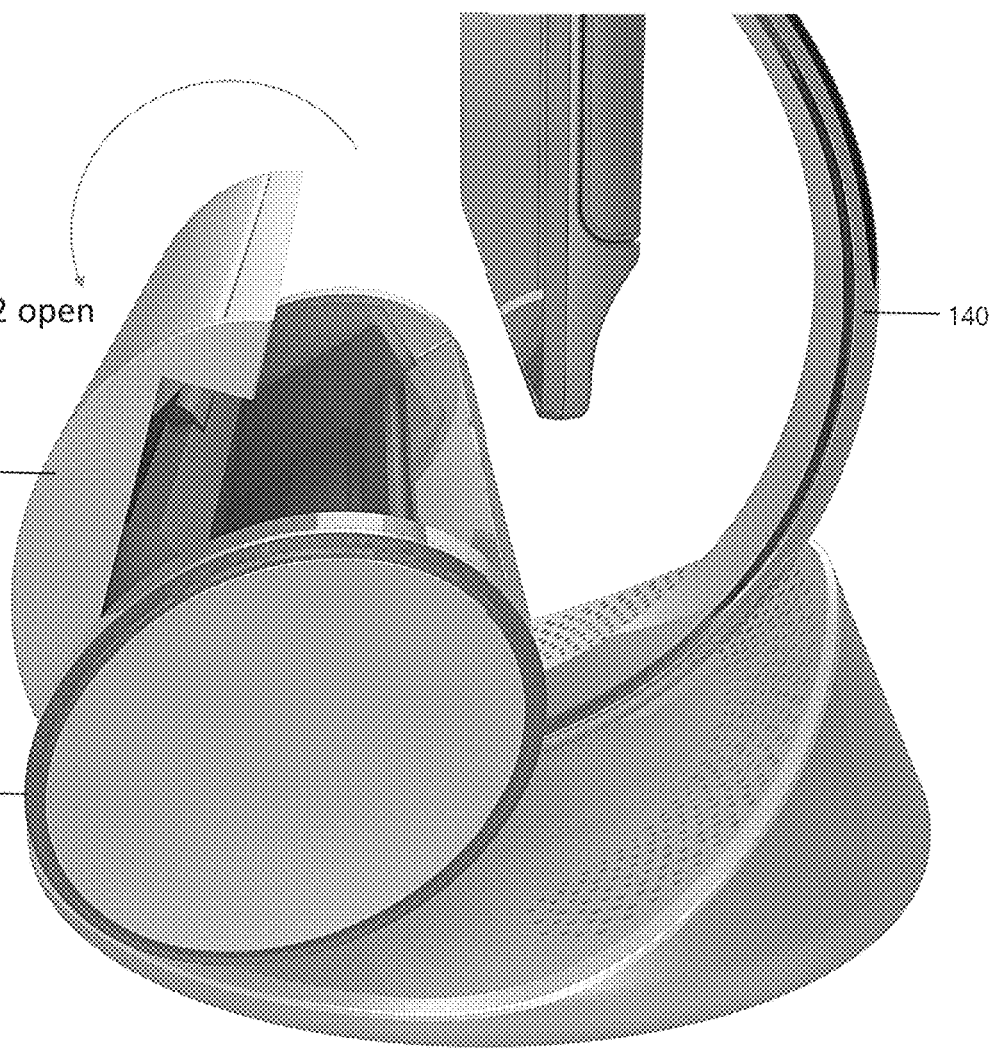

FIGS. 13A and 13B are example perspective views of a multi-function/multi-purpose portable electronic device 500 with scanner doors opened in accordance with aspects of this disclosure. FIGS. 14A and 14B show different perspective views of the configuration of FIGS. 13A and 13B in accordance with aspects of this disclosure. FIGS. 13A and 14A show that a top scanner door 158 is opened, and FIGS. 13B and 14B show that a main scanner door 123 is opened. These scanner doors 158 and 123 may be used, for example, to remove jammed paper or replace components that may be inside.

Figure 15:
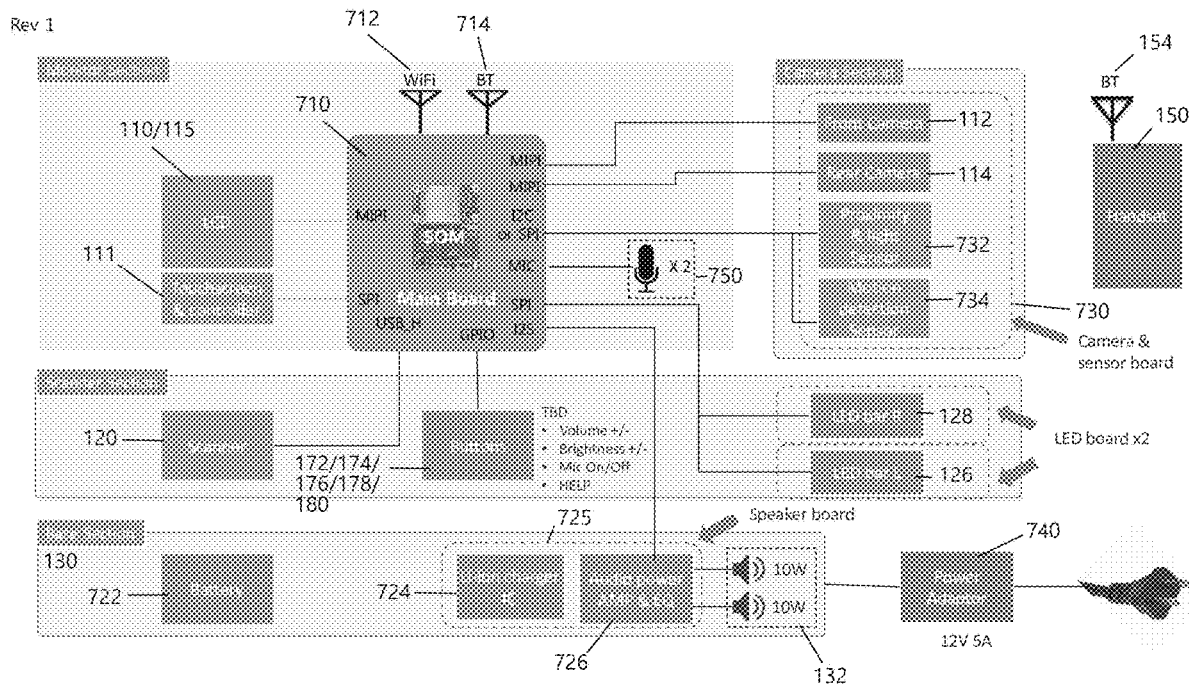
FIG. 15 is an example block diagram of a multi-function/multi-purpose portable electronic device in accordance with some aspects of this disclosure.

FIG. 15 is an example block diagram of a multi-function/multi-purpose portable electronic device 700 in accordance with some aspects of this disclosure. FIG. 16 is another example block diagram of a multi-function/multi-purpose portable electronic device 800 in accordance with other aspects of this disclosure. The multi-function/multi-purpose portable electronic device 700 or 800 is merely an example multi-function/multi-purpose portable electronic device, and certain elements may be modified or removed, and/or other elements or equipment may be added. The block diagram of FIG. 15 or FIG. 16 may be used to configure at least one of the multi-function/multi-purpose portable electronic devices described above with respect to FIGS. 1-14B.

Each of the portable multi-function/multi-purpose devices 700 and 800 can include a monitor section, a camera and sensor board 730, a base section 130 and the handset 150. The monitor section can include a display monitor 110/115, a touchscreen and controller 111, a main board (a controller or processor) 710 and a microphone 750. The main board 710 may also include an antenna 712 for short distance communication (such as WiFi) and an antenna 714 for long distance communication (e.g., for a long distance call). In some embodiments, the main board 710 may be positioned in other locations such as the base 130 or the scanner 130 instead of the display monitor 110/115.

The camera and sensor board 730 can include front and rear cameras 112/114, a proximity sensor 732 and a motion sensor 734. The proximity sensor 732 may detect one or more of a user's proximity, presence or surrounding light changes. The motion sensor 734 may detect motion of a user. For example, on a video call, one or more of the cameras 112/114 may refocus to capture an image of a user or confirm an approaching object size upon the sensors 732/734 detecting new or changed signals.

In certain embodiments, the proximity sensors 732 and light sensors 734 can detect light from an object to determine proximity, detect location, direction of motion, or speed of objects relative to the device 700 or 800. The motion sensor 734 may be configured to detect a force or touch applied by a user and provide the device with command instructions. Signals from the sensors 732 and 734 may be used to activate/deactivate a display light, initiate commands, sense pressure and touch, or control device settings.

The scanner section of the device 700 of FIG. 15 may include the scanner 120, one or more of the buttons 17Z-180 and left and right light pipes 126/128. The scanner section of the device 800 of FIG. 16 may include the scanner 120, left and right touch sensors 162/164 for sensing a touch on one or more of the touch pads 127/129, left and right light pipes 126/128, and a driver 756 configured to drive the light pipes 126/128.

The base section 130 of the device 700 of FIG. 15 may include a battery 722, a speaker board 725 and the speaker 132. The speaker board 725 may include a Li-ion charger IC 724 and an audio power amplifier & equalizer 726 configured to drive the speaker 132 connected to a power adapter 740.

Figure 16:
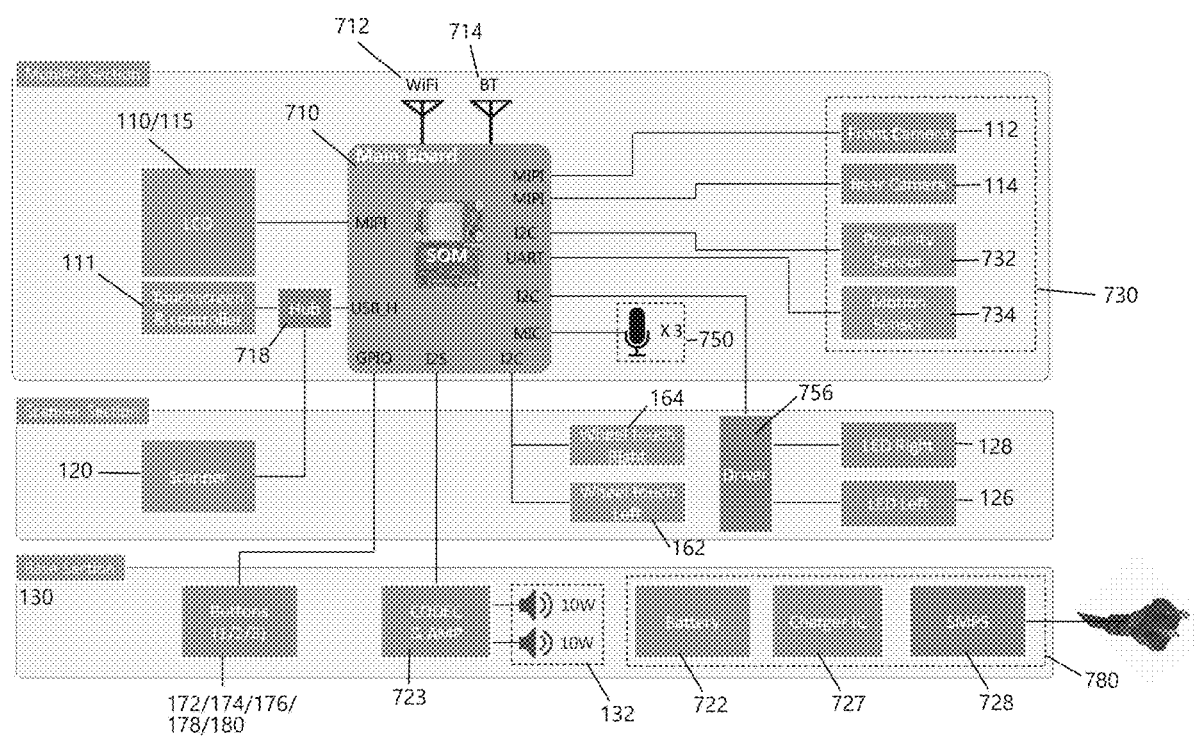
FIG. 16 is another example block diagram of a multi-function/multi-purpose portable electronic device in accordance with other aspects of this disclosure.

The base section 130 of the device 800 of FIG. 16 may include the functional buttons 172-480, a Codec & AMP circuit 723, the speaker 132, and a power supply 780. The power supply 789 may include a battery 722, a battery charger IC 727 and a switched-mode power supply (SMPS) 728.

The main board 710 may control operations of at least one of the components of the device 700 or 800, for example, the display monitor 110/115, the scanner section, the camera & sensor hoard 730, and/or the base section 130. For example, when the proximity sensor 732 or the motion sensor 734 detects no proximity and/or no motion, the main board 710 may control power-consuming components of the device 700 or 800 such as the display monitor 110/115 to move to a sleep mode or power saving mode. The main board 710 of the device 800 of FIG. 16 may be connected to the touch screen & controller 111 and the scanner 120 via a hub 718.

Figure 17:
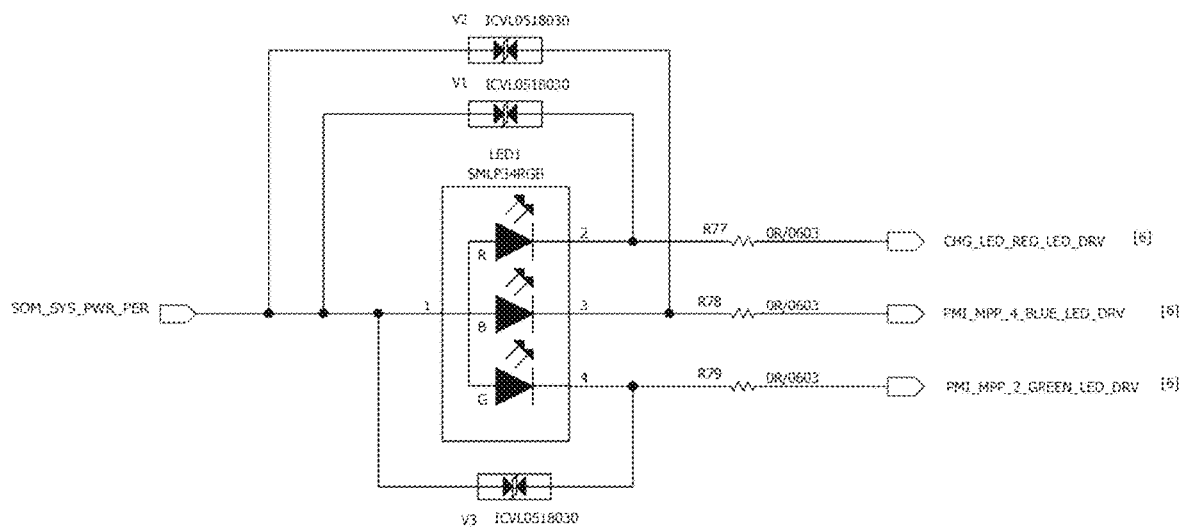
FIG. 17 is an example schematic diagram of the light pipes of the multi-function/multi-purpose portable electronic devices of FIGS. 15 and 16 in accordance with aspects of this disclosure.

FIG. 17 is an example schematic diagram of the light pipes 126/128 of the multi-function/multi-purpose portable electronic devices 700/800 of FIGS. 15 and 16 in accordance with aspects of this disclosure. FIG. 17 is merely an example circuit diagram of the light pipes 126/128, and certain circuit elements may be modified or removed, and/or other circuit elements or equipment may be added.

Figure 18:
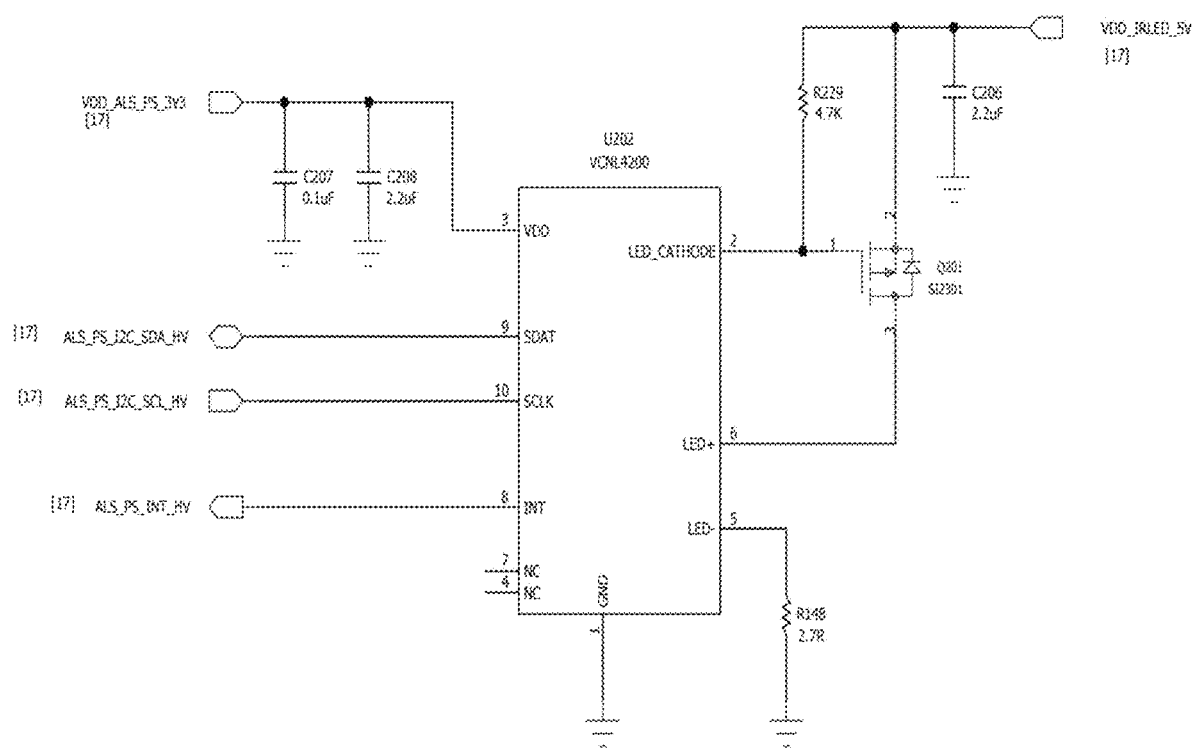
FIG. 18 is an example schematic diagram of the proximity sensor of the multi-function/multi-purpose portable electronic devices of FIGS. 15 and 16 in accordance with aspects of this disclosure.

FIG. 18 is an example schematic diagram of the proximity sensor 732 of the multi-function/multi-purpose portable electronic devices 700/800 of FIGS. 15 and 16 in accordance with aspects of this disclosure. FIG. 18 is merely an example circuit diagram of the proximity sensor 732, and certain circuit elements may be modified or removed, and/or other circuit elements or equipment may be added.

Figure 19:
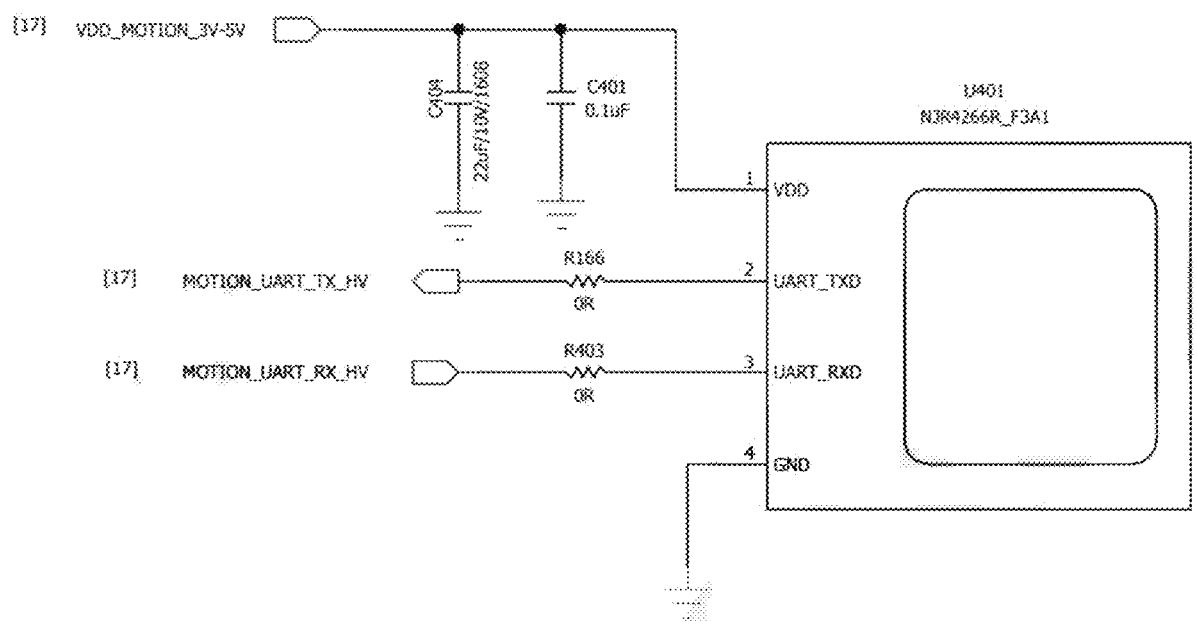
FIG. 19 is an example schematic diagram of the motion sensor of the multi-function/multi-purpose portable electronic devices of FIGS. 15 and 16 in accordance with aspects of this disclosure.

FIG. 19 is an example schematic diagram of the motion sensor 734 of the multi-function/multi-purpose portable electronic devices 700/800 of FIGS. 15 and 16 in accordance with aspects of this disclosure. FIG. 19 is merely an example circuit diagram of the motion sensor 734, and certain circuit elements may be modified or removed, and/or other circuit elements or equipment may be added.

Figure 20:
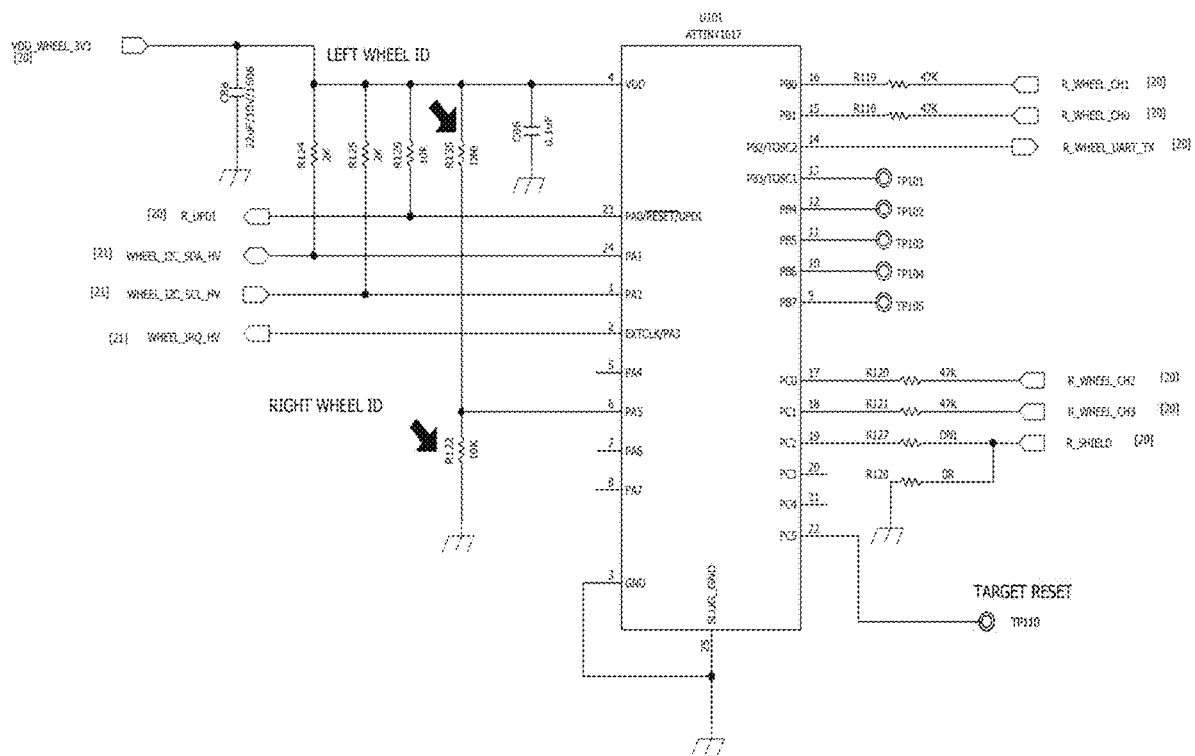
FIG. 20 is an example schematic diagram of the touch pad sensors of the multi-function/multi-purpose portable electronic device of FIG. 16 in accordance with aspects of this disclosure.

FIG. 20 is an example schematic diagram of the touch pad sensors 162/164 for the touch pads 127/129 of the multi-function/multi-purpose portable electronic device 800 of FIG. 16 in accordance with aspects of this disclosure. As described above, at least one of the touch pad sensors 162/164 may sense a touch on one or more of the touch pads 127/129. FIG. 20 is merely an example circuit diagram of the touch pad sensors 162/164, and certain circuit elements may be modified or removed, and/or other circuit elements or equipment may be added.

Figure 21:
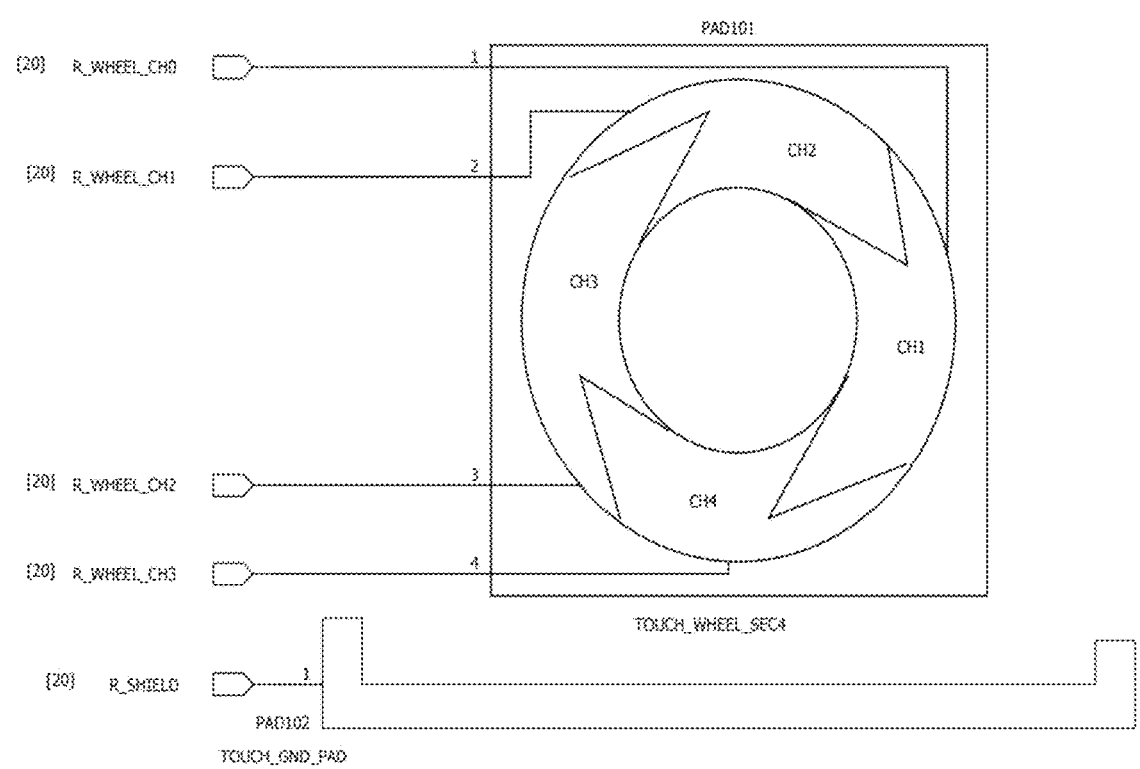
FIG. 21 is an example schematic diagram of the touch pads of the multi-function/multi-purpose portable electronic device in accordance with aspects of this disclosure.

FIG. 21 is an example schematic diagram of the touch pads 127/129 of the multi-function/multi-purpose portable electronic device in accordance with aspects of this disclosure. FIG. 21 is merely an example circuit diagram of the touch pads, and certain elements may be modified or removed, and/or other elements or equipment may be added. One or more of the elements shown in FIGS. 17-21 may be included in at least one ff the multi-function/multi-purpose portable electronic devices described with respect to FIGS. 1-16.

Figure 22:
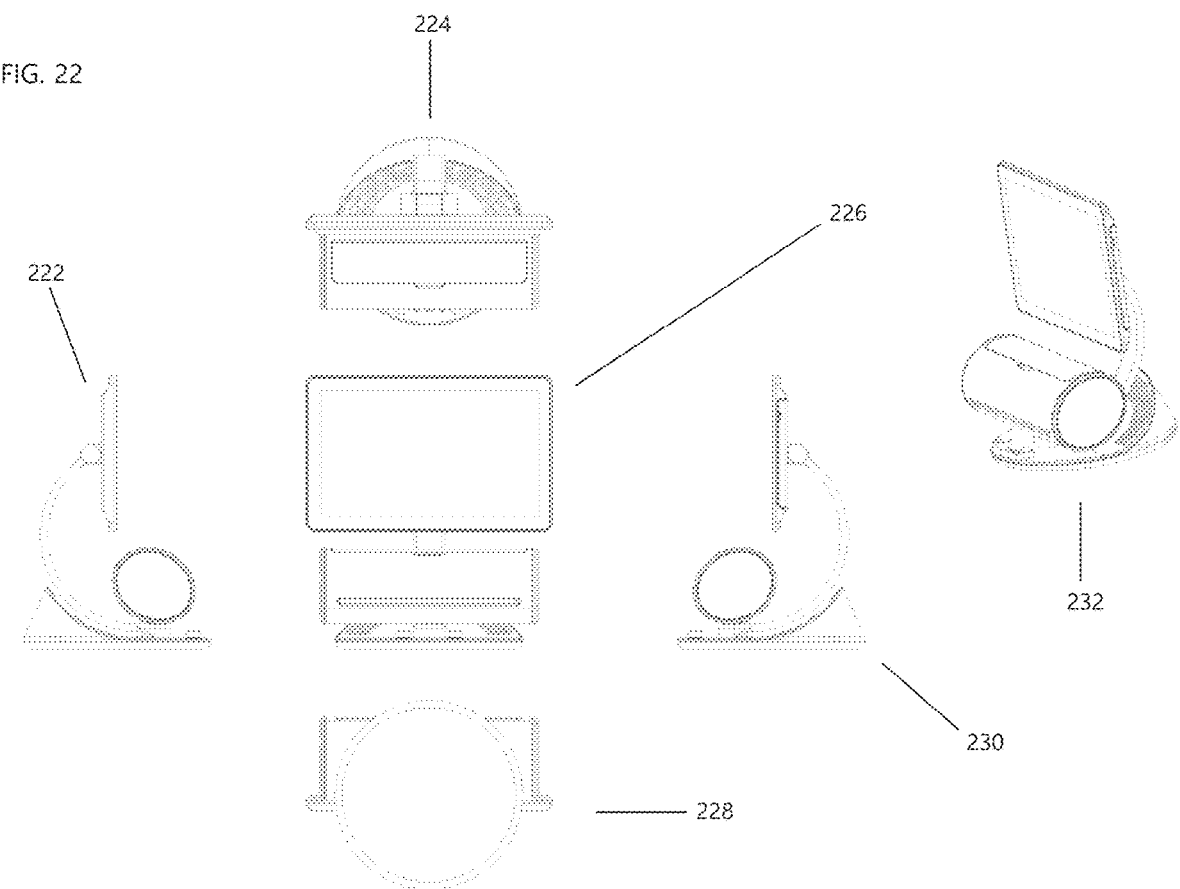
FIG. 22 illustrates sides, front, top, bottom and perspective views of an example multi-function/multi-purpose portable electronic device in accordance with aspects of this disclosure.

FIG. 22 illustrates sides, front, top, bottom and perspective views of an example multi-function/multi-purpose portable electronic device in accordance with aspects of this disclosure. FIG. 22 shows a left side view 222, a top view 224, a front view 226, a bottom view 228, a right side view 230 and a perspective view 232.

Various disclosed embodiments can provide substantial benefits. For example, the described multi-purpose/multi-function portable electronic device include multiple functions such as scanning, a video call, Internet, short-distance and long distance communications, etc. Furthermore the device is lightweight so that a user can easily move around it, for example, between a living room and a kitchen, a bedroom or other areas of a house or building (residential or commercial). Moreover, the device can be electrically or battery powered, wired or wirelessly connected to equip any user of average strength with the power to transport the device as a whole, disassemble it for ease of portability and easily, reassemble the device for use as intended.

Other Variations

The foregoing description details certain embodiments of the systems, devices, and methods disclosed herein. It will be appreciated, however, that no matter how detailed the foregoing appears in text, the systems, devices, and methods can be practiced in many ways. The use of particular terminology when describing certain features or aspects of the disclosure should not be taken to imply that the terminology is being redefined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures can be combined, interchanged, or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

Directional terms used herein (for example, top, bottom, side, up, down, inward, outward, etc) are generally used with reference to the orientation or perspective shown in the figures and are not intended to be limiting. For example, positioning "above" described herein can refer to positioning below or on one of sides. Thus, features described as being "above" may be included below, on one of sides, or the like.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations).

The term "comprising" as used herein is synonymous with "including," "containing," or "characterized by," and is inclusive or open-ended and does not exclude additional, unrecited elements or method steps.

Conditional language, such as "can," "could," "might," or "may," unless specifically stated otherwise, or otherwise understood within the context as used, is generally intended to convey that certain embodiments include, while other embodiments do not include, certain features, elements; and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Language of degree used herein, such as the terms "approximately," "about," "generally," and "substantially" as used herein represent a value, amount, or characteristic close to the stated value; amount, or characteristic that still performs a desired function and/or achieves a desired result. For example, the terms "approximately", "about", "generally," and "substantially" may refer to an amount that is within less than 10% of, within less than 5% of, within less than 1% of, within less than 0.1% of, and/or within less than 0.01% of the stated amount.

It will be further understood by those within the art that any disjunctive word and/or phrase presenting two or more alternative terms, whether in the description, claims, or drawings, can be understood to contemplate the possibilities of including one of the terms, either of the terms, or both terms, example, the phrase "A or B" will be understood to include the possibilities of "A" or "B" or "A and B." Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

The above description discloses embodiments of systems, apparatuses, devices, methods, and materials of the present disclosure. This disclosure is susceptible to modifications in the components, parts, elements, steps, and materials, as well as alterations in the fabrication methods and equipment. Such modifications will become apparent to those skilled in the art from a consideration of this disclosure or practice of the disclosure. Consequently, it is not intended that the disclosure be limited to the specific embodiments disclosed herein, but that it cover all modifications and alternatives coming within the scope and spirit of the subject matter embodied in the following claims.

What is claimed is:

1. A multi-function/multi-purpose portable electronic device, comprising:
   a display monitor including a display screen configured to display an image and a rear surface opposite to the display screen;
   a scanner disposed below the display monitor and configured to scan a document, the scanner including i) an elongated body extending to intersect the display monitor such that at least a portion of the elongated body is directly below the display monitor, ii) first and second touch pads respectively disposed on first and second ends of the elongated body opposing each other, and iii) first and second light pipes surrounding the first and second touch pads and configured to emit light in different colors, the first and second touch pads configured to control the first and second light pipes to change the colors from one color to another different color in response to sensing a touch on at least one of the first and second touch pads;
a base disposed below the scanner, the base including a planar portion and an inclined portion thicker than the planar portion, the display monitor and the elongated body of the scanner at least partially vertically overlapping the planar portion of the base;
a speaker disposed only in the inclined portion of the base and configured to output audio sound;
a scanner support extending from the planar surface of the base toward the scanner and configured to support the scanner;
a power source disposed in the base and configured to supply power to at least one of the display monitor, the scanner or the speaker;
a curved connector extending from the scanner support and connected to the rear surface of the display monitor, the curved connector configured to electrically connect the power source to the display monitor, the curved connector curved to be concave with respect to the scanner and a portion of the rear surface of the display monitor, at least a portion of the curved connector disposed directly above the speaker and the inclined portion of the base, a lower portion of the curved connector curved toward the inclined portion of the base without contacting the inclined portion of the base, an upper portion of the curved connector not vertically overlapping the planar portion of the base; and
a controller configured to control operations of at least one of the display monitor, the scanner, the first and second touch pads, the first and second light pipes, the speaker or the power source,
the first and second light pipes configured to emit light based on the audio sound output from e speaker.

2. The multi-function/multi-purpose portable electronic device of claim 1, wherein the first and second light pipes are configured to emit light having an intensity, proportional to a volume of the audio sound output from the speaker.

3. The multi-function/multi-purpose portable electronic device of claim 1, wherein the display monitor is configured to rotate horizontally and/or vertically.

4. The multi-function/multi-purpose portable electronic device of claim 3, wherein the display monitor is configured to rotate vertically to convert between a vertical screen and a landscape screen.

5. The multi-function/multi-purpose portable electronic device of claim 1, wherein the scanner comprises a document inlet configured to receive a document to be scanned and a document outlet configured to output a scanned document.

6. The multi-function/multi-purpose portable electronic device of claim 5, wherein the document inlet is disposed closer to the display monitor than the document outlet, and wherein the document outlet is disposed closer to the base than the document inlet.

7. The multi-function/multi-purpose portable electronic device of claim 5, wherein the document inlet and the document outlet are disposed to be substantially parallel to the elongated body.

8. The multi-function/multi-purpose portable electronic device of claim 1, wherein the speaker has a semicircular shape in its cross-section.

9. The multi-function/multi-purpose portable electronic device of claim 1, further comprising a handset disposed on the rear surface of the display monitor.

10. The multi-function/multi-purpose portable electronic device of claim 1, further comprising a handset disposed inside the elongated body of the scanner.

11. The multi-function/multi-purpose portable electronic device of claim 10, wherein at least one of the first and second touch pads has an opening configured to receive the handset.

12. The multi-function/multi-purpose portable electronic device of claim 1, further comprising a proximity sensor configured to sense a presence of a user and/or a touch sensor configured to sense a touch on the portable electronic device.

13. The multi-function/multi-purpose portable electronic device of claim 1, further comprising one or more device operation buttons disposed on at least one of the planar portion of the base or an outer surface of the elongated body of the scanner.

14. The multi-function/multi-purpose portable electronic device of claim 13, wherein the one or more device operation buttons comprise at least one of a power on/oft button, a volume button, a brightness button, a microphone on/off button, or a help button.

15. The multi-function/multi-purpose portable electronic device of claim 1, further comprising at least one camera disposed on or incorporated into the display monitor.

16. The multi-function/multi-purpose portable electronic device of claim 15, wherein the at least one camera comprises a front camera disposed on or incorporated into the display screen.

17. The multi-function/multi-purpose portable electronic device of claim 16, wherein the at least one camera further comprises a rear camera disposed on or incorporated into the rear surface of the display monitor.

18. The multi-function/multi-purpose portable electronic device of claim 1, further comprising a first antenna for short range wireless communication and/or a second antenna for long range wireless communication disposed in the display monitor.

19. The multi-function/multi-purpose portable electronic device of claim 1, wherein the inclined portion of the base has a thickness gradually increasing and gradually decreasing.

20. The multi-function/multi-purpose portable electronic device of claim 1, wherein the inclined portion of the base directly faces a lower portion of the curved connector, and wherein the lower portion of the curved connector is curved such that a gap between the lower portion of the curved connector and the inclined portion of the base varies.

21. A multi-function/multi-purpose portable electronic device, comprising:
a display monitor including a display screen configured to display an image and a rear surface opposite to the display screen;
a scanner disposed below the display monitor, the scanner including a body extending to intersect the display monitor and one or more light pipes disposed on a side of the body and configured to emit light;
a base disposed below the scanner, the base including a planar portion and an inclined portion, the display monitor and the body of the scanner at least partially vertically overlapping the planar portion of the base;
a speaker disposed in the inclined portion of the base and configured to output an audio sound;

a scanner support extending from the planar portion of the base toward the scanner to support the scanner;

a curved connector extending from the scanner support and connected to the rear surface of the display monitor, at least a portion of the curved connector disposed directly above the speaker and the inclined portion of the base; and a controller configured to control operations of at least one of the display monitor, the speaker or the scanner, the one or more light pipes configured to emit light based on the audio sound output from the speaker.

22. The multi-function/multi-purpose portable electronic device of claim 21, wherein the scanner further comprises at least one touch pad disposed on the side of the body and configured to emit light in different colors, the at least one touch pad configured to control the one or more light pipes to change the colors from one color to another different color in response to sensing a touch on the at least one touch pad.

23. The multi-function/multi-purpose portable electronic device of claim 21, wherein a lower portion of the curved connector is curved toward the inclined portion of the base without contacting the inclined portion of the base, and wherein an upper portion of the curved connector does not vertically overlap the planar portion of the base.

24. The multi-function/multi-purpose portable electronic device of claim 21, wherein the inclined portion of the base directly faces a lower portion of the curved connector, and wherein the lower portion of the curved connector is curved such that a gap between the lower portion of the curved connector and the inclined portion of the base varies.

* * * * *

UNITED STATES PATENT AND TRADEMARK OFFICE
CERTIFICATE OF CORRECTION

PATENT NO. : 10,778,856 B1  
APPLICATION NO. : 16/837729  
DATED : September 15, 2020  
INVENTOR(S) : Sukjoo Shin Page 1 of 1

It is certified that error appears in the above-identified patent and that said Letters Patent is hereby corrected as shown below:

On the Title Page

Item (72):
"Inventor: Sukjoo Shin, Incheon (KR)"
Should read:
-- Inventors: Arlene Harris, San Diego, CA (US); James Gardner, San Diego, CA (US) --

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*